(12) United States Patent
Kurabayashi et al.

(10) Patent No.: US 8,905,838 B2
(45) Date of Patent: Dec. 9, 2014

(54) DETECTING GAME PLAY-STYLE CONVERGENCE AND CHANGING GAMES

(75) Inventors: Shuichi Kurabayashi, Fujisawa (JP);
Naofumi Yoshida, Yokohama (JP);
Kosuke Takano, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 31 days.

(21) Appl. No.: 13/533,774

(22) Filed: Jun. 26, 2012

(65) Prior Publication Data
US 2013/0344940 A1 Dec. 26, 2013

(51) Int. Cl.
*A63F 9/24* (2006.01)

(52) U.S. Cl.
USPC ........... 463/23; 463/8; 463/9; 463/10; 463/42

(58) Field of Classification Search
CPC ............... A63F 2300/558; A63F 2300/807; A63F 2300/6027; A63F 2300/8029; A63F 13/10; A63F 13/12
See application file for complete search history.

(56) References Cited

U.S. PATENT DOCUMENTS

| | | | |
|---|---|---|---|
| 6,168,524 B1 * | 1/2001 | Aoki et al. | 463/31 |
| 8,029,360 B2 | 10/2011 | Lind et al. | |
| 8,500,558 B2 * | 8/2013 | Smith | 463/42 |
| 2007/0054717 A1 | 3/2007 | Youm et al. | |
| 2007/0066403 A1 * | 3/2007 | Conkwright | 463/43 |
| 2009/0138421 A1 * | 5/2009 | Ansari et al. | 706/25 |
| 2010/0279762 A1 * | 11/2010 | Sohn et al. | 463/23 |
| 2010/0304839 A1 * | 12/2010 | Johnson | 463/23 |
| 2010/0304863 A1 * | 12/2010 | Applewhite et al. | 463/36 |
| 2011/0151953 A1 * | 6/2011 | Kim et al. | 463/1 |
| 2011/0269528 A1 * | 11/2011 | Jacob | 463/23 |
| 2012/0238364 A1 * | 9/2012 | Kurita et al. | 463/31 |
| 2012/0276982 A1 * | 11/2012 | Ansari et al. | 463/23 |

OTHER PUBLICATIONS

Fang et al., "Why do Internet users play massively multiplayer online role-playing games? A Mixed Method", Management Decision, 2009, vol. 47, No. 8, pp. 1245-1260.

(Continued)

*Primary Examiner* — Lawrence Galka
(74) *Attorney, Agent, or Firm* — Maschoff Brennan

(57) ABSTRACT

Gaming technologies for detecting convergence in game play and then changing a game to overcome or inhibit convergence are generally described. In one example, a representative gaming method can include: providing a game simultaneously to a plurality of computing devices; identifying a game scenario type that includes game tests provided to the computing devices; obtaining game actions from the computing devices in response to the game tests; determining a convergence of the game actions across the computing devices that pass the game tests; and changing the game tests of the game scenario type such that the game actions of the convergence fail the changed game tests. The game can be a MMORPG, the game scenario can be a battle; the game tests can be opponents; the game actions can be battle actions; and convergence can be repeated game action patterns that defeat opponents in the battles.

19 Claims, 9 Drawing Sheets

(56) References Cited

OTHER PUBLICATIONS

Blizzard Entertainment, "Wold of Warcraft ® Subscribers Base Reaches 12 Million Worldwide", Oct. 7, 2010, <http://us.blizzard.com/en-us/company/press/pressreleases.html?id=2847881>.

Harding-Rolls, "Subscription MMOGs: Life Beyond World of Warcraft", London, UK, Mar. 24, 2009, Screen Digest <http://www.webcitation.org/5mHRYdUkd>.

Kim et al., "Detection of Auto Programs for MMORPGs", Lecture Notes in Computer Science, 2005, vol. 3809, AI 2005: Advances in Artificial Intelligence, pp. 1281-1284.

Mehrabi et al., "Discovering the Rules in a Poker Player's Mind Based on the Association Rule Mining", In Proceedings of the 2009 International Conference on Computer Technology and Development, vol. 2 IEEE Computer Society, Washington, DC, USA, pp. 189-193.

Japanese Office Action dated Apr. 28, 2014 in Japanese Application No. 2013-078020, 8 pgs.

* cited by examiner

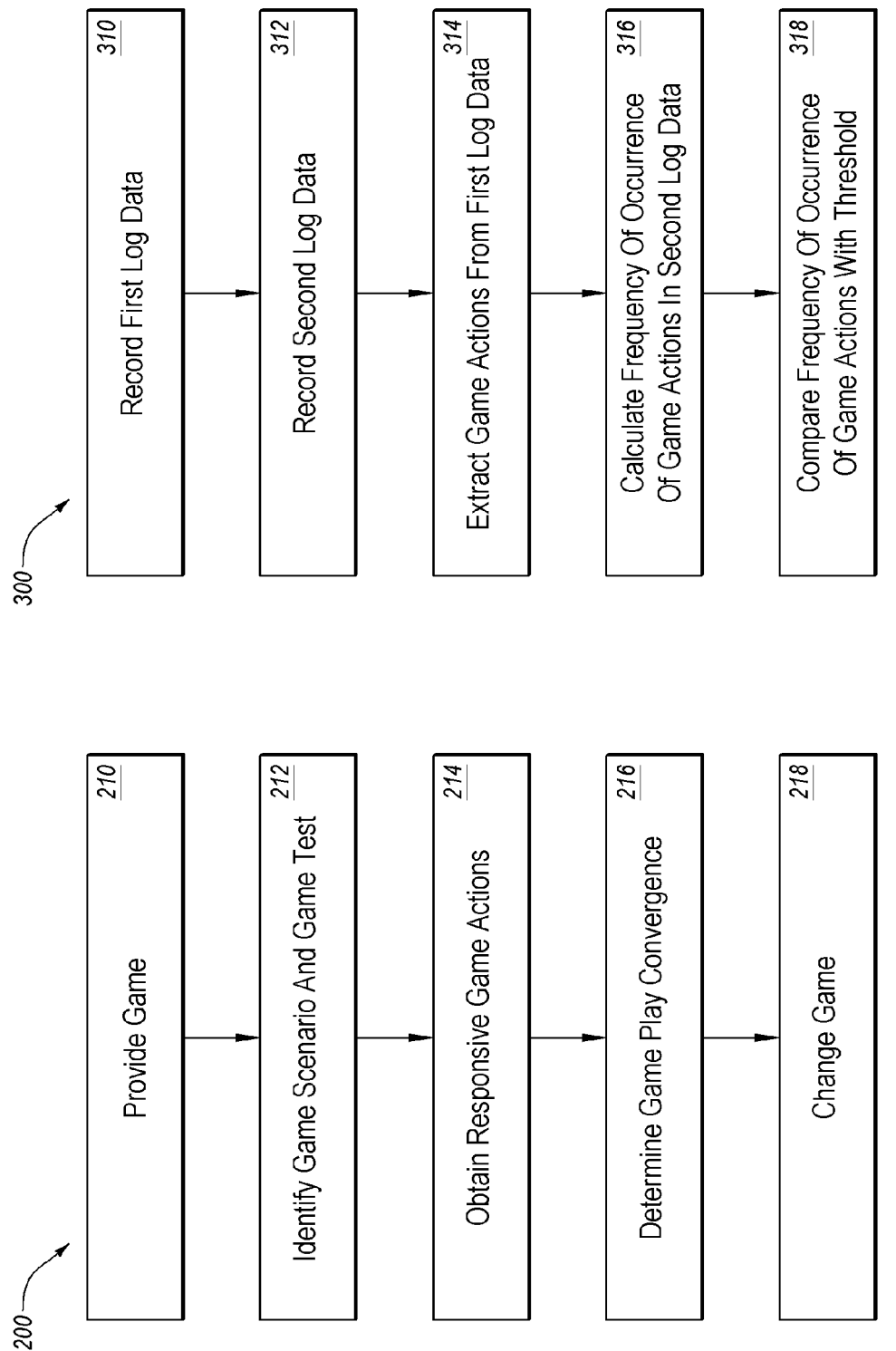

DETECTING GAME PLAY-STYLE CONVERGENCE AND CHANGING GAMES

BACKGROUND

As society developed and people started to gather together they began to play games. Typically, a game is a structured competition between players with some sort of outcome, which can range from winning to losing or tying as well as completing a stage, goal, or task. There are numerous types of games available for play. Games can be played for a number of reasons, and often games are played between people (i.e., the players).

As technology has advanced into and through the computing age, games have followed and have been developed in various computing formats and for different numbers of simultaneous players. The rise of the internet has also resulted in games being played between players from different geographical locations, where friends or strangers can play together online. An example can include the massive multi-player online role-playing game (MMORPG) with thousands of simultaneous players that usually play intermittently over a continuous period of time, which MMORPG may have (or had) a beginning but may or may not have a definitive ending. While there are many different types of MMORPGs, these games often take significant time and practice to become an adept player that is successful at a certain game. Since becoming skilled in a certain game takes some time, players may prefer to play games in which they have invested more time, in which they have more skill, or in which they have learned how to be successful.

SUMMARY

In one embodiment, the present disclosure describes a method for determining convergence in game play and then changing a game, such as an internet-based game, to overcome convergence of game play over multiple computing devices. The number of computing devices can range from two to hundreds, to thousands, or to millions depending on the game. The game can be any type of game that is played over a network with a plurality of devices that connect to a gaming computing system through the network. The game can be facilitated with a gaming computing system that includes one or more centralized game computing centers that host the game activities; however, other game hosting configurations can be used. The method of determining convergence in game play and changing a game can include: providing a game simultaneously to a plurality of computing devices; identifying a game scenario type of the game that includes one or more game tests provided to the computing devices; obtaining one or more game actions from the plurality of computing devices in response to the one or more game tests of the game scenario type; determining a convergence of the one or more game actions across the computing devices that pass the one or more game tests; and changing the one or more game scenario types or game tests of the game scenario type, such that the one or more game actions of the convergence fail the changed one or more game scenario types or game tests. The one or more game actions can be a combination of game actions that form a game action pattern.

In one embodiment, a method of changing a game can be implemented by a gaming system. The gaming system can include: a gaming server configured to be operably coupled to and provide a game simultaneously to a plurality of computing devices, the gaming server including a game scenario type of the game, and where the game scenario type has one or more game tests; a game action logging module operably coupled to the gaming server; a first log database operably coupled to the game action logging module and having one or more game actions for the one or more game tests; a second log database operably coupled to the game action logging module and having one or more game actions for the one or more game tests associated with computing devices of the plurality of computing devices; a game action pattern detection module operably coupled to the first log database; a game action convergence analyzing module operably coupled to the second log database and to the game action pattern detection module, and configured to determine a convergence of one or more game actions across the computing devices that pass one or more game tests of the game; and a game change module operably coupled to the game action convergence analyzing module and to the gaming server, and configured to change one or more game tests of the game scenario type such that the one or more game actions of the convergence fail the changed one or more game tests.

In one embodiment, a method for changing a game can be implemented on a gaming system. The method can include: executing a game on a gaming server that is operably coupled to and provides the game simultaneously to a plurality of computing devices, the gaming server including a game scenario type of the game, the game scenario type having one or more game tests; in a game action logging module that is operably coupled to the gaming server, obtaining one or more game actions from the plurality of computing devices in response to the one or more game tests of the game scenario type; recording game actions for the one or more game tests into a first log database, which are received from the game action logging module; recording game actions for the one or more game tests associated with the plurality of computing devices into a second log database, which are received from the game action logging module; calculating a frequency of occurrence of game action patterns from the first log and selecting co-occurrent game actions of the game action patterns that have frequencies of occurrence exceeding a frequency of occurrence threshold in a game action pattern detection module operably coupled to the first log database; calculating a frequency of occurrence of game actions of the second log database for each of the selected co-occurrent game actions of the game action patterns from the game action pattern detection module to determine convergence of one or more game actions in response to the one or more game tests in a game action convergence analyzing module operably coupled to the second log database and to the game action pattern detection module; determining that the game is to change the one or more game tests of the game scenario type when convergence is determined in a game change module; and changing the one or more game tests such that the one or more game actions of the convergence fail the changed one or more game tests with the gaming server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 2 includes a flow diagram that describes a method for detecting convergent game play and changing a game;

FIG. 3 includes a flow diagram that describes a method for detecting convergent game play;

Figure 1:
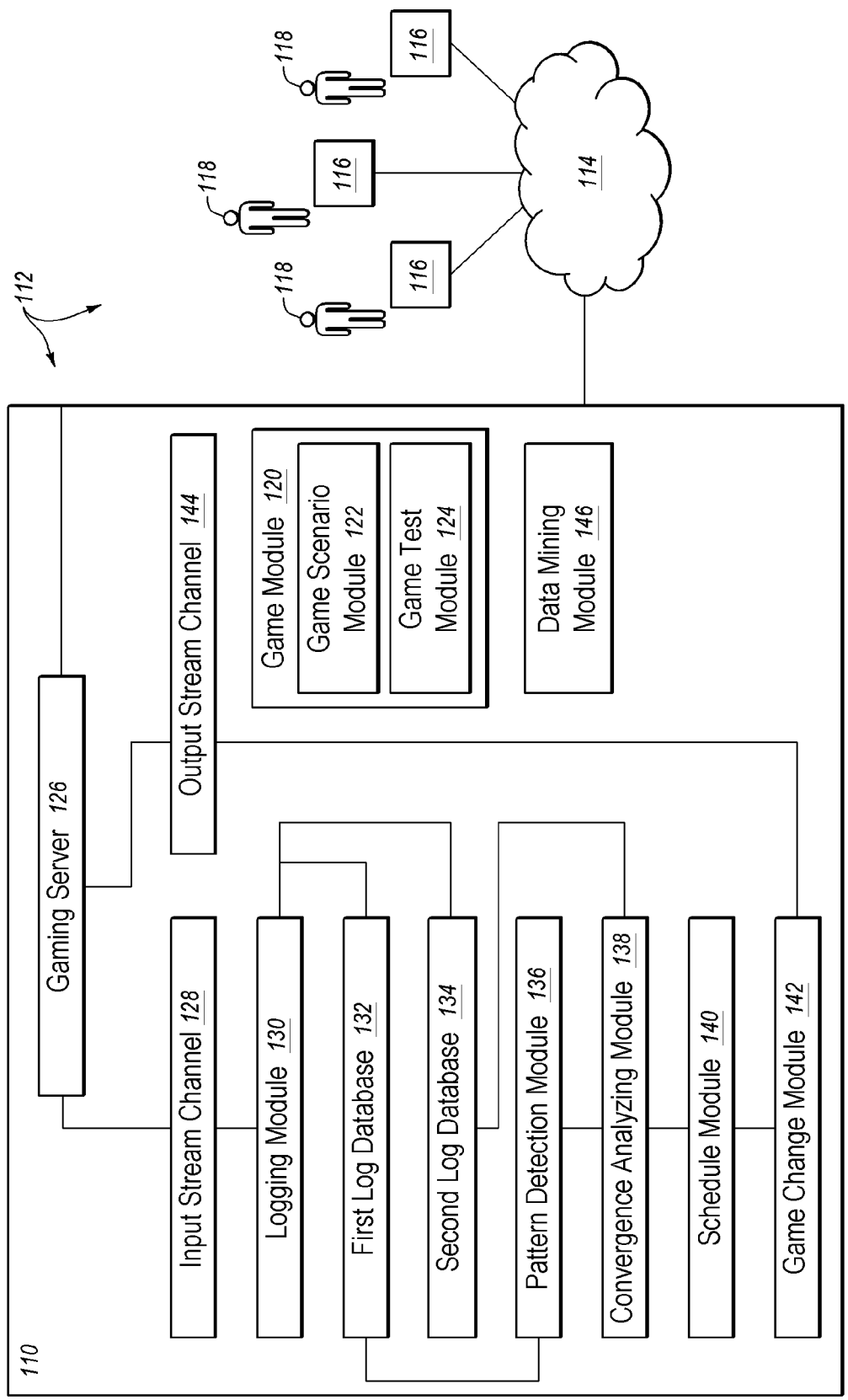
FIG. 1 includes a schematic representation of a gaming network adapted to detect convergent game play in a game played over the gaming network.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, an online game can be enjoyed by players when there is sufficient quality of experience ("QoE") in playing the game. Maintaining the QoE can be important for long-term success of a game, especially a MMORPG that is configured to be continued and played over a substantial period of time or even played indefinitely. After a player becomes bored of a game (e.g., from low QoE) or the game becomes predictable, the player may switch to another game. As such, it can be beneficial to change a game to keep some excitement (e.g., from high QoE) and/or unpredictability so that a player feels incentivized to continue playing the same game over a substantial period of time.

Accordingly, the present technology includes gaming systems, gaming networks, and gaming methods for maintaining or improving QoE in a game. The game can be any computer game that is played with multiple computing devices that communicate with each other and/or one or more gaming systems, such as a gaming system having one or more centralized game computing systems that host the game. The QoE can be improved by detecting convergence in game play actions by multiple players over multiple computing devices, and then changing the game so that the game play actions that had become convergent are no longer beneficial or successful for use in the game. After the game has been changed, the players may need to learn and adapt to the changes and develop new game play actions to find a way to play the game to overcome the obstacles or accomplish goals of the game, such as by overcoming game scenarios or game tests.

In some embodiments, a reduction in QoE of playing a game can arise due to convergent game play. Convergent game play can be described as a phenomena that occurs when a player determines a successful game play action pattern having a number of game actions, which is somehow passed on to other players so that a group of players are implementing the same game play action pattern. Here, a "game play action" can include an input, keystroke or other response from a player to the game when the player is actively playing the game, and thereby the player implements the "game play action." The game play action can be a single response, which can be exemplified in a game having battles as a single game play action battle move, such as a hit, kick, spell, weapon fire, missile file, or the like. Often, a single game play action can be insufficient to overcome a game scenario, game test, game level, game opponent, game battle, or other feature, challenge, or task in a game. As such, a player may need to implement multiple game play actions in a game play action pattern for success. The "game play action pattern" can include a number of game actions that are implemented in a pattern. Each player can implement game play actions to play the game, and thereby the "game play actions" can generally be referred to as "game actions" by the players.

A game action pattern can be any combination of game actions that are implemented together by a player by interacting with a computing device running the game. For example, a game having battles can include a player implementing a game action pattern having a combination of any of the following battle moves: hit, kick, spell, weapon fire, missile file, or the like. In some instances, the game action pattern can be implemented in a manner so as to have a sequence of game actions or sequences of game action combinations. Generally, a game action pattern can have a sequence of two or more game actions. Some game action patterns can be complex and include four, five, or higher number of game actions in a specific game action pattern where the game actions can be repeatedly and frequently implemented together in the same game action pattern. For example, a game action pattern for a battle game can include the following sequences: hit+spell; or hit+kick+spell. A game action pattern may often be repeated in the exact sequence by a player after the game action pattern is determined to be successful.

Many computing devices that run games provide keyboards, mouse input devices, knobs and buttons or the like that, when actuated in the proper manner and sequence, can cause a game action or game action pattern so that some type of player activity happens in the game. Many games may be provided with a list of knob and button actuations that can generate specific game actions or game action patterns, such as a special fight move or fight move sequence. When a combination of game actions arises from a keyboard, mouse input device knob and button actuation, and the combination of game actions becomes sequential and repeated a number of times, the combination of game actions can be considered to be a game action pattern. While various types of input can be implemented with the computing device running the game in order to generate a combination of game actions, the game actions can be analyzed for a common game action pattern, which game action pattern can be analyzed for convergent game play. For example, the computing device can record the high-level or abstracted game play actions (e.g., "sword attack," "bow and arrow attack," "crossbow attack," "spell of fire magic," "spell of frost magic," or the like) and analyze the game play actions for a pattern that is repeated. When a pattern of game play actions is repeated, convergence may be determined. Accordingly, convergent game play can occur when a number of players adopt the same game action pattern.

Convergent game play can be described to occur when two or more specific game actions become "co-occurrent" or have "co-occurrence," and such co-occurrent game actions are implemented repeatedly and frequently over a population of players. As used herein, when specific game actions become "co-occurrent" or have "co-occurrence," two or more specific game actions are implemented together in a combination or sequence during game play by a player. That is, two or more specific game actions are implemented together and/or in sequence in a game action pattern so that the two or more game actions are "co-occurrent" or have "co-occurrence" with respect to the game play. For example, the game action patterns "hit+spell" or "hit+kick+spell" can have co-occurrence with respect to the individual actions (e.g., hit, kick, or spell). When two or more game actions become co-occurrent, there is an indication that at least one player is converging game play to the co-occurrent game actions. When the frequency of occurrence of co-occurrent game actions increases or passes a threshold, the co-occurrent game actions may be considered to be convergent with respect to at least one player.

When the co-occurrent game actions start being used by multiple players, for example, against a common test, then the co-occurrent game actions may be considered to be convergent game actions or be part of convergent game play.

FIG. 1 includes a schematic representation of a gaming network 112 adapted to detect convergent game play in a game played over the gaming network 112, arranged in accordance with at least some embodiments described herein. The gaming network 112 can include a gaming system 110 operably coupled to a network 114 that is also operably coupled with a number of computing devices 116 that are operated by a number of players 118. The gaming system 110 can include a game module 120, a game scenario module 122, a game test module 124, a gaming server 126, an input stream channel 128, a logging module 130, a first log database 132, a second log database 134, a pattern detection module 136, a convergence analyzing module 138, a schedule module 140, a game change module 142, an output stream channel 144, and a data mining module 146. While the various components of the gaming system 110 are shown to be connected with lines that show the components being operably coupled in a specific configuration, any of the components in the gaming system 110 can be operably coupled together and can be capable of communicating data therebetween.

The gaming system 110 can be any type of computing system with one or more computers that can operate alone or together to run a game and to transmit game data of the game to the computing devices 116, to receive game data from the computing devices 116, and to analyze the game data. The gaming system 110 can include one or more computer-readable data storage devices (not shown) that can be configured to store game data, where the game data can include data regarding game scenarios and game tests as well as game actions or game action patterns that are implemented by any one of the players 118. For example, game data can be saved in the game module 120. Additionally, the gaming system 110 can include one or more processors (not shown) that are configured to process game data or otherwise function as a processor in the gaming system 110. The game module 120 can include computer-readable instructions that are executable by the processor to implement the game. The gaming system 110 can include one or more computing modules (not shown) that can be configured to implement any standard computing process or gaming process as well as any data analytical process. The gaming system 110 can implement a method for detecting convergent game play and changing a game in response to the convergent game play as described herein.

The gaming system 110 may be a unitary computing system or a distributed computing system with a number of centralized computing centers that cooperate to facilitate the game. This configuration can be found in online games where a centralized computing center in one geographical location can host certain aspects or regions of the game, while other centralized computing centers in other geographical locations can host other aspects or regions of the game. The computing devices 116 can hop between the different centralized computing centers of a gaming system 110 depending on the manner in which the game is played. However, each of the centralized computing systems can cooperate with each other such that the players 118 experience continuity in game play that feels like the game is seamless. Accordingly, in some embodiments, any number of centralized computing systems that run the game may be referred to collectively as the gaming system 110.

The network 114 can be a local network, a regional network, or a world-wide network such as the Internet, which can include one or more public or private local area networks (LANs), wide area networks (WANs), or other network configurations, that can facilitate game play on a number of computing devices 116 that are operably coupled to the network 114.

The computing devices 116 can be a same type of computing device or different types of computing devices 116, and may be referred to as gaming devices when running a game. Any number of computing devices 116 can be included in the gaming network 112, which can range from two or three computing devices 116, to hundreds, thousands or millions of computing devices 116. The computing devices 116 can be general home computers, gaming computers (e.g., Xbox 360, Wii, Sony Playstations, etc.), desktop computers, laptop computers, notebook computers, netbook computers, tablet computers, hand-held devices, smart phones, or any other computing device. The computing devices 116 can each be operated by an individual player 118. Different players 118 may operate different computing devices 116. Each of the computing devices 116 can include one or more user interfaces (not show), which can vary depending on the computing devices 116, and can include an output user interface and an input user interface. An example output user interface may include, but is not limited to, a display screen, a speaker, a vibrator, or combinations thereof. An example input user interface may include, but is not limited to, a standard keyboard, buttons, a mouse, a stylus, a touch pad, a scroll knob, a touch screen, or combinations thereof. The players 118 can interface with the computing devices 116 through the user interfaces to receive game data, and in response to a game scenario or game test, and to input game actions into the computing devices 116 to generate game action data. That is, the game action data can be derived from the game actions that are input by the players 118 into the computing devices 116, which implementations of game actions can include one or more keystrokes or other interactions with an input user interface of the computing devices 116. As such, game action data can represent the game actions input into the computing devices 116 by the players 118.

The interconnectivity of the gaming system 110 with the computing devices 116 that are operating the game with the players 118 allows for game play data to be received and stored by the gaming system 110. During the game, each player 118 can implement a series of game actions into their computing device 116 to interact with the game. The series of game actions implemented by the player 118 can be in response to game tests posed by the game, and the game actions implemented by the player 118 can be an attempt to pass or otherwise overcome the game tests. For example, the game tests can include a certain battle or a battle against a certain monster or enemy, and thereby the series of player game actions can be implemented to win the battle or defeat the certain monster or enemy (e.g., overcome the game tests). The series of game actions can be received and stored by the gaming system 110 for analysis of convergence in the game action patterns.

The gaming server 126 can be configured to be operably coupled to and provide a game simultaneously to a number of computing devices 116. The gaming server 126 can be operably coupled to the game module 120, game scenario module 122, and/or game test module 124 to implement the game such that the game can be played on the computing devices 116. The game scenario module 122 can be configured to provide game scenarios to the gaming server 126. The game test module 124 can be configured to provide game tests to the gaming server 126. In some embodiments, the game scenario module 122 and the game test module 124 can be part of the overall game module 120. In these and other embodiments, the game scenario module 122 can be configured to implement the game scenarios, and the game test module 124 can be configured to implement the game tests of the game scenarios. The game module 120 can include the game and can facilitate game play through the gaming server 126, and can be configured to run the game and exchange game data with the gaming server 126. The game module 120 can include or be coupled to the scenario module 122 that is configured to provide game scenarios to the gaming server 126 and receive game data to modulate the game scenarios during game play. The game module 120 can include or be coupled to the game test module 124 that is configured to provide game tests to the gaming server 126 and to receive game data to modulate the game tests during game play. The game test module 124 can provide appropriate game tests in accordance with the game scenarios. As such, the game scenario module 122 can determine the types of game tests for certain game scenario types and the game test module 124 can process the game tests and provide the game tests for game play. The game can include computer-executable instructions that can be stored on the one or more a computer-readable data storage devices (not shown), and run on one or more processors (not shown) or through one or more modules, such as the game module 120, of the gaming system 110.

Generally, a game scenario module 122 can include one or more game scenarios that can be represented by a scene or situation in the game. Game scenarios can vary depending on the type of game. The game scenarios can include game play output that is provided to the players 118 by the computing devices 116. The game play output can include one or more game objects that are interacted with by player objects that are controlled by the players 118, through implementing game play input into the computing devices 116. The game objects can include opponents in a battle, and the player objects can include avatars of the players 118. For example, the game scenarios can include battle scenarios that provide battle game data to the players 118, such battle game data can include visual, sound, and vibratory stimulus, as game play output that causes the players 118 to provide battle game actions as game play input.

The game test module 124 can provide a game test to the players 118 that can be overcome or passed before the players 118 can move on or progress through the game. Each game scenario can have specific types of game tests. The game tests can include a challenge, quest, task, puzzle, battle, opponent, level boss, monster, or the like. Game tests can be designed to be overcome by game actions for each player 118 to progress through the game. However, game action patterns may be learned by the players 118 that overcome game tests in general, that overcome particular types of game tests, (e.g., monsters) or that overcome a specific game test (e.g., a specific monster).

The gaming server 126 can be configured to receive game action data from the computing devices 116, and may be coupled to the input stream channel 128 as illustrated in FIG. 1. The input stream channel 128 may function as a conduit for game action data received by the gaming server 126 to be stored and/or processed by components of the gaming system 110. The input stream channel 128 can be operably coupled to the logging module 130. Generally, the logging module 130 can be configured to receive and record game action data from the input stream channel 128, where the game action data is input into the computing devices 116 by the players 118 and transmitted over the network 114 to the gaming system 110. As such, the logging module 130 can be configured to receive game data of the game actions from the computing devices 116 in response to game tests of the game scenarios. Also, the logging module 130 can record logs of any type of game data, such as battle game actions in response to battle scenarios or opponent tests, which may include any data for any of the opponents of the battles and the game actions implemented by the players 118 in response to the battles and/or opponents.

The logging module 130 can determine whether game data can be logged in the first log database 132 and/or in the second log database 134. The first log database 132 can be operably coupled to the logging module 130, and can have data of the game actions for the game tests. The game actions can include responses by the players 118 to the game tests, which game actions can be logged in the logging module 130, and recorded in the first log database 132 and/or in the second log database 134. The second log database 134 can be operably coupled to the logging module 130, and have game actions for the game tests associated with individual computing devices 116. In some embodiments, the first log database 132 may include game actions for the whole game while the second log database 132 may include game actions per player.

The first log database 132 can be configured to include first log data of the game actions for the game tests received from the computing devices 116. The first log data of the first log database 132 can be independent of a specific computing device 116. However, the first log data of the first log database 132 can be arranged to associate the game actions with the game tests. The second log database 134 can include second log data of the game actions for the game tests associated with the particular computing devices 116 that received the game actions from the players 118. That is, the second log data of the second log database 134 can be arranged to be associated with a specific computing device 116 or specific player 118.

The pattern detection module 136 can be operably coupled to the first log database 132 and/or the second log database 134, and may be capable of obtaining game data from the logging module 130 or the gaming server 126. The pattern detection module 136 can be configured to calculate frequencies of occurrence of the game action patterns from the first log database 132, and can be configured to select co-occurrent game actions of the game action patterns having frequencies of occurrence exceeding a predetermined threshold (e.g., frequency of occurrence threshold). Accordingly, the pattern detection module 130 can extract co-occurrent game actions with high frequencies of occurrence from the first log database 132. The extracted co-occurrent game actions can have high co-occurrence probabilities. The pattern detection module 136 can be configured to include the calculated frequency of occurrence values of the extracted game actions from the first log database 132. The pattern detection module 136 can also include extracted co-occurrent game actions of the game action patterns from the first log database 132 that exceed the frequency of occurrence threshold.

The convergence analyzing module 138 can be operably coupled to the second log database 134 and to the pattern detection module 136. The convergence analyzing module 138 can be configured to determine convergence of game actions across the number of computing devices 116 that pass the game tests of the game. The convergence analyzing module 138 can be configured to calculate the frequency of occurrence in the second log database 134 for the co-occurrent game actions of the game action patterns extracted by the pattern detection module 136 from the first log database 132. Accordingly, the convergence analyzing module 138 can be configured to calculate frequency of occurrence of co-occurrent game actions of the second log database 134 for the extracted game action patterns from the pattern detection module 136 to determine convergence of game action patterns in response to the game tests. The convergence analyzing module 138 can determine co-occurrent game actions that are included in convergent game action patterns in the second log database 134, when the same co-occurrent game actions are used by a number of the computing devices 116. The more computing devices 116 that use the same game action patterns, the higher the frequency of occurrence, and thereby the higher frequency of occurrence in the second log database 134 indicates convergent game action patterns. Also, as the number of players using the same game action patterns increases, the likelihood of convergent game action patterns increases across a population of the computing devices 116.

In some embodiments, the convergence analyzing module 138 can be configured to automatically detect convergence in play styles during a game for a number of different computing devices 116. The term "play style" can be considered to include the game play output (e.g., game provided to players 118) and the game play input (e.g., game actions implemented by the players 118 that respond to the game play output) such that the players 118 implementing the game actions can have a preferred set of game actions or preferred game action patterns that are repeated in response to the game scenarios and game tests. The players 118 can develop their own unique play style; however, successful and advantageous play styles can be passed between players 118, such as being posted online, in forums, or distributed during the game.

The convergence analyzing module 138 can operate in real time during game play to monitor for convergence in play styles, or operate intermittently or periodically on a scheduled regimen to monitor for convergence. The convergence analyzing module 138 can use game play output data and game play input data for any period of time or duration of game play that is in real time or from saved data. The convergence analyzing module 138 can thereby automatically detect convergence in play style so that the gaming system 110 can implement a proper strategy (e.g., via the schedule module 140) to change the gaming system 110 or game module 120, to change the reaction of the game to the convergent play style such that the convergent play style has reduced success and the players 118 are incentivized to reduce use of the convergent play style.

The convergence analyzing module 138 can operate by combining analysis of a number of game action logs (e.g., the first log database 132) that have a log of the game actions in response to the game tests (e.g., battle against opponent), conducted in a game scenario (e.g., general battle), and analysis of additional game action logs (e.g., the second log database 134) for a game test of the players 118. The players 118 can be an arbitrary or defined number of players 118 or group of players 118 that is a fraction of the total number of players 118, or it can be all of the players 118. Upon analysis, the convergence analyzing module 138 can determine whether there is convergence when game action patterns are found to be repeated frequently across a population of players 118.

The schedule module 140 can be configured to schedule certain actions for the gaming system 110, such as scheduling game changes in response to a determination of convergent game play. Accordingly, systematically changing the game in a manner that changes the game play during actual play or during scheduled game down times can be implemented to prevent players 118 from getting tired of playing the game by implementing a game change to overcome or inhibit convergent game play. As such, the schedule module 140 can provide information regarding the schedule of the game change to the output stream channel 144 so that the appropriate output data can be facilitated on schedule by the gaming server 126.

In some embodiments, the schedule module 140 can be used in methods for implementing scheduling of game changes. The game changes can include changes to the game software, game module 120, game scenario module 122, game test module 124, gaming server 126, or gaming system 110 in general. The changes to the game scenarios or game tests can be configured such that the changes overcome, counteract or inhibit convergent game play. The game can be scheduled for change in accordance with maintaining or improving the QoE. For example, the game can be scheduled to be changed by a game change protocol that can automatically detect the timing at which users may be getting tired of current game scenarios or game tests by determining convergent game play, and then scheduling the game change.

In example embodiments, the schedule module 140 can be configured as a QoE-aware game system change scheduler that can be implemented to change the game in response to a need to maintain or improve QoE, such as in response to convergent game play. As such, the schedule module 140 can receive data related to QoE, and can schedule game changes to maintain or improve QoE as well as to inhibit degradation of QoE. The schedule module 140 can schedule game changes to occur at defined times and can issue notifications to computing devices 116, and thereby the players 118 can be aware of gaming system changes and can schedule their gaming sessions to avoid interference from a scheduled game change.

The game change module 142 can be configured to change the game when game play convergence is determined. The game change module 142 can be configured to receive data regarding convergent game play from the convergence analyzing module 138, and can then implement a protocol to change the gaming system 110 or game module 120 to change the game. As descried herein, a change to the game can be implemented by changing the gaming system 110, the gaming server 126, or the game module 120 as well as the scenario module 122 and/or the test module 124 in a manner such that the game is changed. The game change module 142 can change the game by receiving convergent game action patterns and changing the game so that these received convergent game action patterns are no longer effective in the game. The game change module 142 can either create the game change or receive the game change from an outside source, and then implement the protocol for changing the game.

The game change module 142 can be configured or otherwise programmed to function in a certain manner after convergence of game play has been detected. That is, the game change module 142 can be programmed with a game change in response to convergent game play. The types of responsive programmed functions to convergent game play can be selected from actions that can inhibit or reverse the convergent game play. Some examples of responsive programmed functions can include the gaming system 110 being changed in some manner so that game action patterns involved in the convergence become less useful, such as changing the game itself, changing the game module 120, changing the game scenario module 122, changing the game test module 124, changing the implementation of the game by the gaming server 126, reducing effectiveness of game action patterns against game tests, or other changes that overcome the convergent game play.

In some embodiments, the gaming system 110 can include the data mining module 146 that may be configured to mine game data, such as data related to game actions implemented by a number of computing devices 116. The data mining module 146 can be configured to mine the game play data for certain properties. The game action data in general and game action data in response to specific game tests can be mined to identify co-occurrent game actions (e.g., game action patterns) implemented by the computing devices 116 that are repeated and used frequently over a period of time. The data mining module 146 can also mine the game data to identify the different game tests provided to computing devices 116 running the game, and to identify game tests that are subject to convergent game action patterns.

The process of data mining implemented by the data mining module 146 can use a protocol that is configured to detect auto-programs, cheat programs, player bots, or other like non-human players to detect game play actions that are repetitive and frequent over a number of computing devices 116. For example, the data mining protocol can modify a technology for detecting auto-programs, such as cheating programs that perform battling actions on behalf of users and automatically accumulate experience points and items. See Mehrabi and Haghighat (Afshin Mehrabi and Abolfazl Toroghi Haghighat, "Discovering the Rules in a Poker Player's Mind Based on the Association Rule Mining", In Proceedings of the 2009 International Conference on Computer Technology and Development—Volume 02 (ICCTD '09), Vol. 2, IEEE Computer Society, Washington, D.C., USA, 189-193). In these and other embodiments, the particular data that is mined can be set to be repetitive and frequent co-occurrent game actions for individual computing devices 116, a number of computing devices 116, a defined population or group of computing devices 116, or all of the computing devices 116. The data mining can alternately or additionally be performed by the data mining module 146 to find convergent game actions amongst a group of the computing devices 116 in response to game tests.

The gaming system 110 can be configured to prevent degradation of QoE over a substantial period of game play by a number of players 118 on computing devices 116. That is, the QoE can be maintained so that the players 118 continue to play the game. The QoE can be maintained by changing the game to keep it fun and interesting to play. The substantial period of game play can be intermittent or continuous. By being "intermittent," the game can be played by a player 118 that plays for periods of time separated by breaks. However, some games can be "continuous" and played on an ongoing basis without any interruption or breaks in play. In both the intermittent and continuous game plays, the total number of minutes played in the game or the total time that has lapsed in the real world can be the basis for a period of time of game play. The length of time for a substantial period of game play can range from playing the game over a number of days, weeks, months or even years. An example of a substantial period of time of game play in terms of real world time can include three weeks of intermittent play in the evenings before bed. Alternatively, a substantial period of time can be in terms of time in the game, which may be exemplified by fifty or one hundred or more total hours of game play.

In some instances, QoE degradation can be prevented by changing the game play of the game, such as a changing the response of the game to convergent game play. The "game play" can be considered to include the game play output of the game that is provided by the gaming server 126 and received by the players 118 via the computing devices 116, and/or the "game play" can include game play input implemented by the players 118 that includes game play actions (i.e., game play actions can be considered to be game actions by a player) being input into the computing devices 116 in response to the game play output, as well as the correlation and combination of output of the game and input by the players 118 and how the output and input interact in the game. Accordingly, "game play" can be referenced as game play output that is received by the players 118 from the computing devices 116, and can include game play input that is received by the computing devices 116 from the players 118, and the correlation or combination of the game play output and the game play input. The game play can be changed after convergence to a game action pattern is detected. The change in game play can be implemented so that the game actions that were the subject of convergence become less successful or no longer successful in the game play after the game change. The game play can be changed so that the game action patterns for particular game scenarios or game tests that were successful and subject to convergence are no longer successful or beneficial for the particular game scenarios or game tests in which the game play action patterns were utilized and previously successful.

The changed game play can be implemented for a variety of reasons related to game play convergence, such as keeping a level of fairness between players 118 involved in a convergence of game actions with those players 118 that are not involved in the convergence of game play. For example, a game action pattern, such as a combination of keystrokes, can be identified as being successful to overcome a game test, and the knowledge of the combination of keystrokes can be dispersed through a number of players 118. Players 118 that know the combination of keystrokes of the game action pattern can have an advantage over players 118 that don't know the game action pattern. As such, detecting a convergence in use of a specific combination of keystrokes (e.g., convergence in game action pattern), and changing the game so that the specific combination of keystrokes or game action pattern is no longer successful can prevent QoE degradation.

In some embodiment, the QoE of a game can be maintained or improved by implementing a fully automatic or semi-automatic convergence detection scheme by the convergence analyzing module 138. The convergence analyzing module 138 can be operably coupled with the game change module 142 that is configured to determine a change to the game to overcome or inhibit the convergent game play. That is, the game change module 142 can create a change to the game that maintains or improves QoE. The game change module 142 can be operably coupled with the schedule module 140 that can schedule a game change. By being fully automatic, the game can be automatically changed by the game change module 142 creating a change to the game in response to detection of game play convergence by the convergence analyzing module 138. By being semi-automatic, the game can be changed manually, such as by a human creating the game change and then implementing the game change via the gamming system 110. For example, the game change can be created outside of the gaming system 110 and then introduced into the game change module 142.

The embodiments described herein may be applicable to a wide variety of games that are played on computing devices 116 that communicate with the gaming system 110. Any game that provides game tests to computing devices 116 and receives game actions from the computing devices 116 in response to that game tests can be analyzed for convergent game play and changed as described herein. The game can be of any genre or theme, including games that can be configured to obtain game data of game tests (e.g., game play output data) and responsive game action data (e.g., game play input data). For example, the keystrokes, joystick actuation, button activation, or combinations thereof, patterns thereof, or other manual actions that implement the responsive game action in response to a game test can be recorded and analyzed by the gaming system 110 for convergence.

FIG. 2 includes a flow diagram that describes a method 200 for detecting convergent game play and changing a game, arranged in accordance with at least some embodiments described herein. The method 200 can include the following operations: "Provide Game" (block 210); "Identify Game Scenario and Game test" (block 212); "Obtain Responsive Game Actions" (block 214); "Determine Game Play Convergence" (block 216); and "Change Game" (block 218).

With combined reference to FIGS. 1-2, the method 200 can include providing a game simultaneously to a number of computing devices 116 ("Provide Game" block 210). The Internet can be used as the network 114 for providing the game as well as receiving game actions from the computing devices 116.

The method 200 can include identifying at least one game scenario type of the game that includes at least one game test provided to the computing devices 116 ("Identify Game Scenario And Game Test" block 212). It may be beneficial for the gaming system 110 to log the different game tests so that convergent game play can be analyzed for game tests generally or for specific game tests.

The method 200 can include obtaining game actions from the computing devices 116 in response to the game tests of the game scenarios ("Obtain Responsive Game Actions" block 214). As such, the players 118 can interact with the game via the computing devices 116 so that the game actions that are input into the computing devices 116 are transmitted to the gaming system 110.

The method 200 can include determining convergence of the game actions across the computing devices 116 that pass the game tests ("Determine Game Play Convergence" block 216). Here, the game actions can be analyzed for co-occurrent game actions that are repeated by a number of computing devices 116, and which can be successful for overcoming the game tests.

After convergence is determined, the game can be changed. As such, the method 200 can include changing the game tests of the game scenarios such that the game actions of the convergence fail the changed game tests ("Change Game" block 218).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 3 includes a flow diagram that describes a method 300 for detecting convergent game play, arranged in accordance with at least some embodiments described herein. The method 300 can include the following operations: "Record First Log Data" (block 310); "Record Second Log Data" (block 312); "Extract Game Actions From First Log Data" (block 314); "Calculate Frequency Of Occurrence Of Game Actions In Second Log Data" (block 316); and "Compare Frequency Of Occurrence Of Game Actions With Threshold" (block 318). As with all of the methods described herein, the method 300 of FIG. 3 can be used alone or in conjunction with any other method described herein.

With combined reference to FIGS. 1 and 3, the method 300 can include recording first log data into the gaming system 110 ("Record First Log Data" block 310), where the first log data can include the game actions for the game tests received from the computing devices 116. The computing system 110 can record the first log data into the first log database 132 that is independent of a specific computing device 116, and arranged with respect to the game tests associated with the game actions. The first log data can be represented by Table 1 below, which is for an example game having battles.

The method 300 can include recording second log data into the gaming system 110 ("Record Second Log Data" block 312), where the second log data can include the game actions for the game tests from the individual computing devices 116. That is, the gaming system 110 can record the second log data into the second log database 134 that is dependent on a specific computing device 116. The second log data can be represented by Table 2 below, which may also be for the example game having battles. The second log data can be recorded by any manner in which the gaming system 110 can record and store data, such as with the computer-readable data storage devices.

The method 300 can include extracting one or more game actions with high co-occurrence from the first log data in the first log database 132 ("Extract Game Actions From First Log Data" block 314). Accordingly, data mining protocols can be used to mine the game data of the game actions for game action patterns that repeat or occur frequently during the game or in response to general or specific game scenarios or in response to general or specific game tests. The mined game actions can be co-occurrent game actions, especially co-occurrent game actions that are repeated by a number of computing devices 116.

The method 300 can include calculating frequency of occurrence of the extracted game actions in the second log data of the second log database 134 ("Calculate Frequency Of Occurrence Of Game Actions In Second Log Data" block 316). As such, the game actions represented by the second log data of the second log database 134 can be processed to calculate the frequency of occurrence of certain game actions or game action patterns that were extracted from the first log data of the first log database 132.

The method 300 can include comparing the calculated frequency of occurrence with a frequency of occurrence threshold ("Compare Frequency Of Occurrence Of Game Actions With Threshold" block 318). When the calculated frequency of occurrence is greater than or equal to the frequency of occurrence threshold, convergence of the extracted one or more game actions, and thereby convergence of game play, may be determined.

The frequency of occurrence threshold or other threshold described herein can be set at any suitable level that makes sense for game play. The threshold can be set to be higher for co-occurrent game actions with two co-occurrent game actions, than co-occurrent game action patterns with five co-occurrent game actions. That is, game action patterns with more game actions being co-occurrent can have a lower threshold with respect to occurrence than game action patterns with less game actions being co-occurrent. For example, a game action pattern having three co-occurrent game actions can have a threshold of 50% where a game action pattern having five co-occurrent game actions can have a threshold of 25%. The co-occurrent game actions may be present in response to, e.g., 20% of the game tests or 20% of a specific game test. Accordingly, a threshold associated with a frequency of occurrence of co-occurrent game may be set with respect to all game tests or with respect to a specific game test at 20%; however, other examples can include 25%, 40%, 50%, 60%, or greater than 70% of game tests or a specific game test. Alternately or additionally, the threshold can be set with respect to a percentage of players that implement a co-occurrent game action pattern being 10%, 20%, 25%, 40%, 50%, 60%, or greater than 70% of the players implementing the same co-occurrent game action pattern.

Table 1 shows an example data structure of the first log database 132 (e.g., Log 1). When there are "n" types of game actions that can be implemented by players 118, Log 1 can be defined as a matrix storing the numbers of game actions "Action-1" to "Action n" as integers greater than or equal to 0 for each battle (e.g., Battle-1 to Battle-x). In Table 1, Time represents the time of the battle, and Battle-ID represents a unique identifier assigned to the battle. The integers greater than or equal to 0, associated with each of Action-1 to Action-n, may represent the numbers of times the respective actions were performed during a battle. The gaming system 110 can extract game action patterns with high co-occurrence probabilities from the matrix. For example, when calculating the probability of co-occurrence of Action-1 and Action-2, the gaming system can count the number of rows in which the values for both Action-1 and Action-2 are greater than or equal to 1, and divide the count by the total number of rows, thereby calculating the probability of co-occurrence.

TABLE 1

Log 1 Data Structure

| Time | Battle-ID | Action-1 | Action-2 | ... | Action-n |
|------|-----------|----------|----------|-----|----------|
| Time 1 | Battle-1 | 1 | 1 | ... | 0 |
| Time 2 | Battle-2 | 0 | 2 | ... | 1 |
| ... | ... | ... | ... | ... | ... |
| Time x | Battle-x | 1 | 0 | ... | 1 |

Table 2 shows an example data structure of the second log database 134 (e.g., Log 2). Log 2 records battle game action logs for each player 118 (e.g., Player-1 to Player-m), which may include a minimum participant unit in a battle. When there are "n" types of game actions in the gaming system, with combinations of Player-ID and Battle-ID as keys, Log 2 can be defined as a matrix storing the numbers of "Actions 1" to "Actions n" as integers greater than or equal to 0 for each battle (e.g., "Battle-1" to "Battle-x") for each player. In Table 2, Player-ID may represent a unique identifier assigned to a given player involved in the battle, and Battle-ID may represent a unique identifier assigned to the beginning of the battle. The integers greater than or equal to 0, associated with "Action-1" to "Action-n" may represent the number of times those game actions were performed at the beginning of a battle. The information stored in the matrix portion of Log 2 may be identical to that of Log 1. However, Log 1 may be temporally sorted for analyzing a specified time range or specified battle, whereas Log 2 may be sorted on a player-by-player basis for per-player analysis, so that the analytical methods may be different between Log 1 and Log 2. Since a log can contain a large number of ordered lists of elements, it may be possible to perform analysis more quickly by storing Log 1 and Log 2 on separate storage devices, and/or optionally in duplicate at the cost of disk capacity.

TABLE 2

Log 2 Data Structure

| Player-ID | Battle-ID | Action-1 | ... | Action-n |
|-----------|-----------|----------|-----|----------|
| Player-1 | Battle-1 | 1 | | 0 |
| ... | ... | ... | ... | ... |
| Player-1 | Battle-x | 3 | | 1 |
| ... | | | | ... |
| Player-m | Battle-1 | 2 | | |
| ... | ... | ... | ... | ... |
| Player m | Battle-x | 3 | | 1 |

Figure 4:
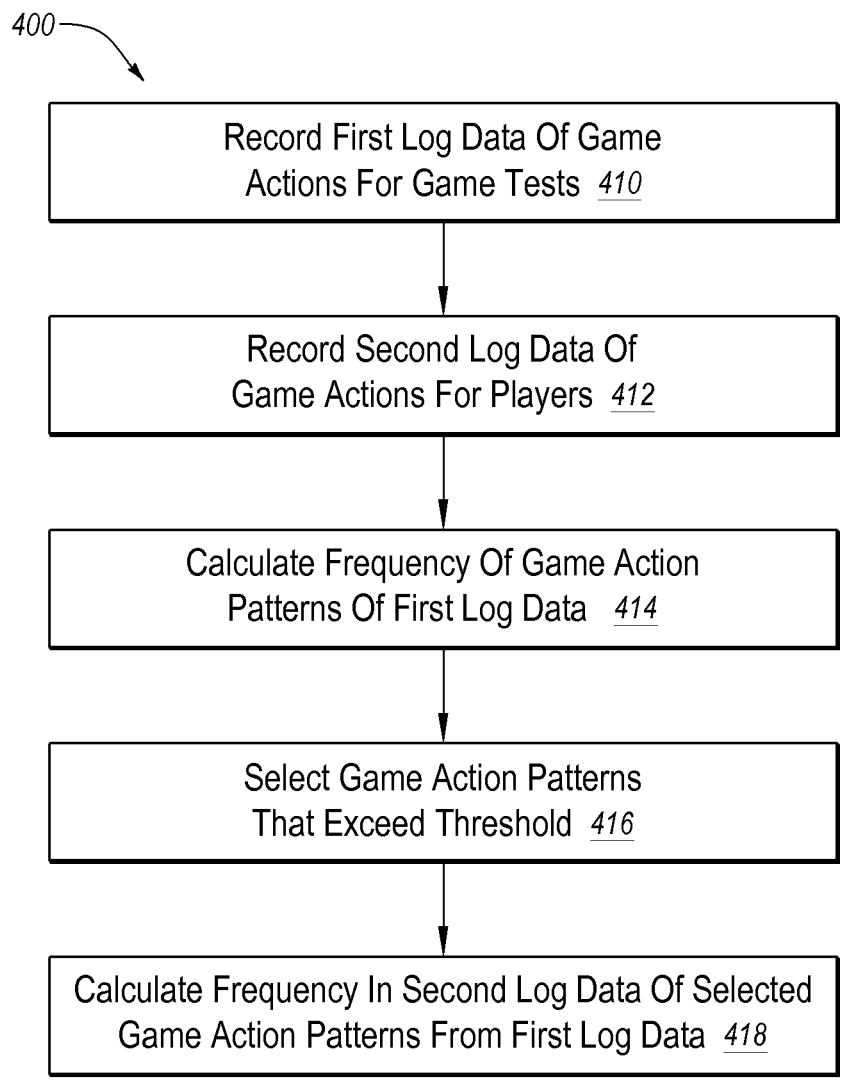
FIG. 4 includes a flow diagram that describes a method for detecting convergent game play.

FIG. 4 includes a flow diagram that describes a method 400 for detecting convergent game play, arranged in accordance with at least some embodiments described herein. The method 400 can include the following: "Record First Log Data Of Game Actions For Game Tests" (block 410); "Record Second Log Data Of Game Actions For Players" (block 412); "Calculate Frequency Of Game Action Patterns Of First Log Data" (block 414); "Select Game Action Patterns That Exceed Threshold" (block 416); and "Calculate Frequency In Second Log Data Of Selected Game Action Patterns From First Log Data" (block 418). The method 400 can be used in combination with any of the other methods described herein.

With combined reference to FIGS. 1 and 4, the method 400 can include recording first log data in the first log database 132, the first log data representing the game actions for game tests from the players 118 ("Record First Log Data Of Game Actions For Game Tests" block 410). The game actions can be logged in response to specific game tests or general game tests. Accordingly, the frequency of occurrence of co-occurrent game actions in the first log database 132 can vary depending on the game tests being analyzed, such as general game tests (e.g., different level bosses) or specific game tests (e.g., specific level boss).

The method 400 can also include recording second log data in the second log database 134, the second log data representing the game actions in response to the game tests from the players 118 ("Record Second Log Data Of Game Actions For Players" block 412). The second log database 134 can include the game actions implemented by the individual players 118 in response to the game tests, where the second log database 134 can have the data for the game actions organized on a per player 118 basis.

The method 400 can include calculating the frequency of occurrence of the co-occurrent game actions of the game action patterns from the first log data in the first log database 132, where some combinations of co-occurrent game actions can be framed as game action patterns ("Calculate Frequency Of Game Action Patterns Of First Log Data" block 414). The frequency of occurrence can be calculated by any manner that illustrates the amount or occurrence rate of co-occurrent game actions of game action patterns implemented by the players 118. The co-occurrent game actions of game action patterns that are used more frequently can have a higher frequency of occurrence than game action patterns that are seldom used.

The method 400 can include selecting game action patterns with co-occurrent game actions in the first log database 132 that exist as unique game action patterns that occur at a frequency that exceeds the frequency of occurrence threshold ("Select Game Action Patterns That Exceed Threshold" block 416). That is, co-occurrent game actions of game action patterns that occur with enough frequency to be labeled as unique game action patterns that are used by a number of players 118 can be selected for determining convergence of game play. The selected game action patterns can be the extracted game action patterns that are extracted from the first log database 132.

The method 400 can include calculating frequency of occurrence in the second log data of the second log database 134 of the selected game action patterns from the first log data of the first log database 132, such as game action patterns from Log 1 of Table 1 ("Calculate Frequency In Second Log Data Of Selected Game Action Patterns from First Log Data" block 418). As such, co-occurrent game actions of game action patterns that are used frequently in the first log database 132 can be compared to the second log database 134 to determine whether or not the game action patterns are convergent. Game action patterns that are extracted from the first log database 132 and used frequently in the second log database 134 can be considered to be convergent game action patterns. Thus, convergent game action patterns can be determined when the extracted game action patterns have a frequency of occurrence in the second log database 134 that exceeds a frequency of occurrence threshold.

Figure 5:
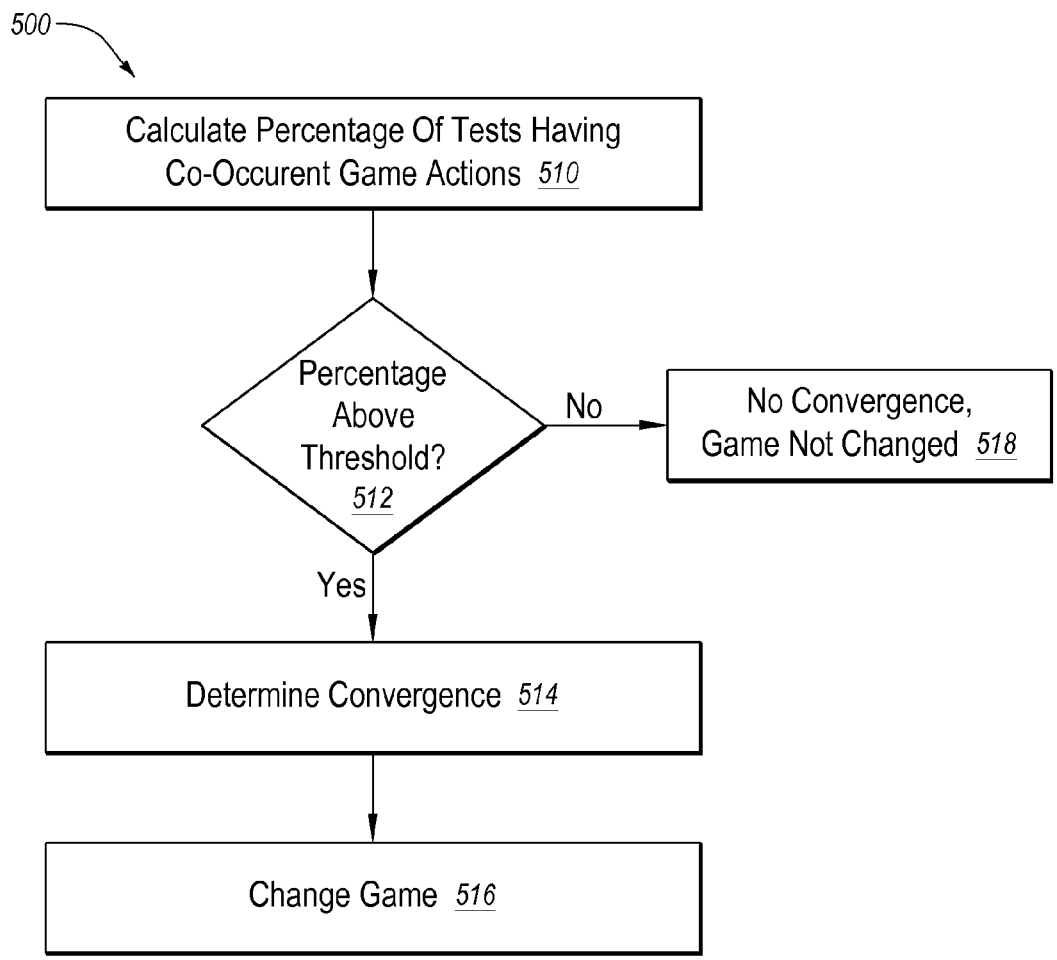
FIG. 5 includes a flow diagram that describes a method for detecting convergent game play and changing a game.

FIG. 5 includes a flow diagram that describes a method 500 for detecting convergent game play and changing a game, arranged in accordance with at least some embodiments described herein. The method 500 can include the following: "Calculate Percentage Of Tests Having Co-Occurrent Game Actions" (block 510); "Percentage Above Threshold?" (block 512); when the percentage is above a threshold (e.g., "Yes"), "Determine Convergence" (block 514); and "Change Game" (block 516); when the percentage is below the threshold (e.g., "No"), "No Convergence Game Not Changed" (block 518). The method 500 can be used in combination with any of the other methods described herein.

With combined reference to FIGS. 1 and 5, the method 500 can include calculating a percentage of the game tests from the second log database 134 that result in the extracted game action patterns having co-occurrent game actions from the logged game tests of the first log database 132 ("Calculate Percentage Of Tests Having Co-Occurrent Game Actions" block 510). The percentage of game tests having co-occurrent game actions can be calculated on a basis of some, a portion, or all of the game tests of the second log database 134. As such, the percentage of game tests that have the co-occurrent game actions can be based on the action logs of the individual players 118. The extracted game action patterns can be the same across the first log database 132 and second log database 134 such that there may be convergence to the extracted game action patterns that have co-occurrent game actions when the percentage is high. Accordingly, the percentage of the game tests of the second log database 134 having co-occurrent game actions in game action patterns can provide insight into convergence. A relatively high percentage may suggest that the game action patterns have converged over a population of players 118.

When the percentage of game tests of the second log database 134 having the co-occurrent game actions extracted from the first log database 132 is above a predetermined percentage threshold ("Percentage Above Threshold?" block 512), the convergence of game play can be determined ("Determine Convergence" block 514). The percentage threshold can be arbitrarily set depending on the needs of the game and level of QoE.

The method 500 can include changing the game to overcome convergent game play when convergent game patterns are determined ("Change Game" block 516). As such, game tests of the game scenario type may be changed.

When the percentage of game tests having co-occurrent game actions is below the predetermined percentage threshold, the method 300 can determine that there is no convergence, and the game is not changed ("No Convergence, Game Not Changed" block 518). The percentage threshold can be set at 20% in some embodiments. Alternately, the percentage threshold may be set at 25%, 40%, 50%, 60%, or greater than 70%, or other predetermined percentage threshold.

Figure 6:
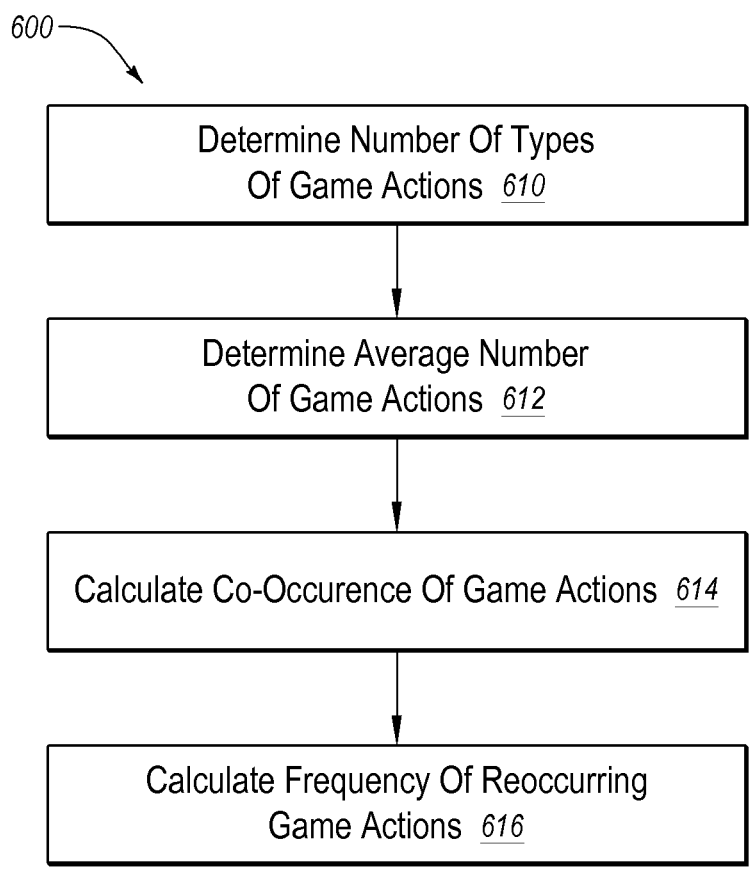
FIG. 6 includes a flow diagram that describes a method for detecting convergent game play.

FIG. 6 includes a flow diagram that describes a method 600 for detecting convergent game play, arranged in accordance with at least some embodiments described herein. The method 600 can include the following: "Determine Number Of Types Of Game Actions" (block 610); "Determine Average Number Of Game Actions" (block 612); "Calculate CoOccurrence Of Game Actions" (block 614); and "Calculate Frequency Of Reoccurring Game Actions" (block 616). The method 600 can be used for calculating the frequency of occurrence of co-occurrent game actions, which can be useful in determining whether or not there is convergence in game play, and can be used alone or with any of the other methods described herein. Such a method 600 can process one or more equations that can be used for determining frequency of occurrence of co-occurrent game actions. There may be various protocols and equations for such a determination of frequency of occurrence, where one example is provided herein; however, other suitable protocols and equations can be used.

In more detail, the method 600 can include determining that there are "n" types of game actions for the game tests ("Determine Number Of Types Of Game Actions" block 610). Such a determination of "n" types of game actions can be implemented by data mining using the game tests and the responsive game actions.

The method 600 can also include determining an average number of game actions, which can be represented by "r" ("Determine Average Number Of Game Actions" block 612).

The method 600 can then include calculating a number of possible game actions with co-occurrence to be "nHr" from Equation 1 below using the "n" types of game actions and average number of game actions "r" ("Calculate Co-Occurrence Of Game Actions" block 614).

The method 600 can include calculating the frequency of occurrence of reoccurring combinations of co-occurrent game actions from "nHr" ("Calculate Frequency of Reoccurring Game Actions" block 616). The calculated frequency of reoccurring co-occurrent game actions can provide an indication of convergent game play when the frequency is high or above a threshold.

Figure 7:
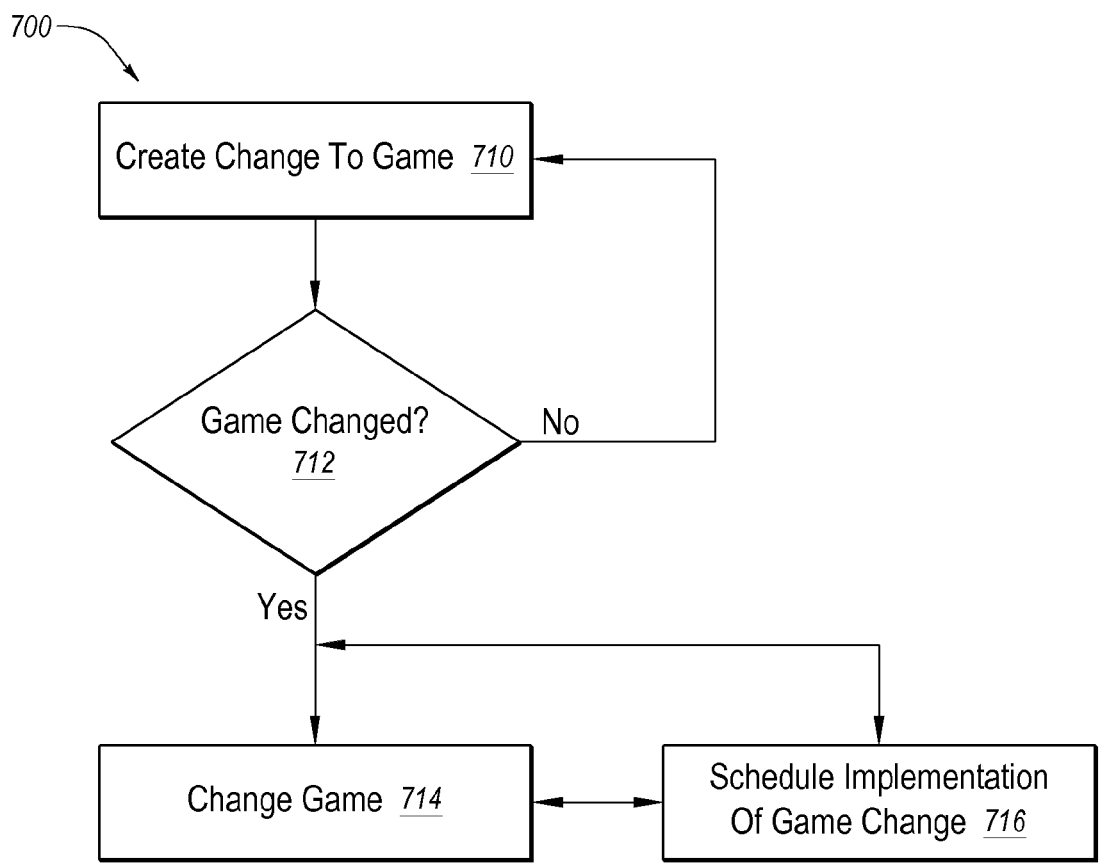
FIG. 7 includes a flow diagram that describes a method for changing a game in response to convergent game play.

FIG. 7 includes a flow diagram that describes a method 700 for changing a game in response to convergent game play, arranged in accordance with at least some embodiments described herein. The method 700 can include the following: "Create Change To Game" (block 710); "Game Changed?" (block 712); if the game changed (e.g., "Yes"), "Change Game" (block 714) or "Schedule Implementation Of Game Change" (block 716); or if the game did not change (e.g., "No"), "Create Change To The Game" (block 710). As such, the method 700 can be an iterative method that is processed through a number of iterations until the game is suitably changed. The method 700 can be used alone or in combination with any of the other methods described herein.

With combined reference to FIGS. 1 and 7, the method 700 can include creating a change to one or more game tests ("Create Change To Game" block 710). The change to the game tests can include changes to the effectiveness of previously successful game action patterns with respect to parameters of a given one of the game tests. The change in the game can also be described with respect to the gaming response to game action patterns becoming changed or resistant to the same gaming action patterns being used repeatedly and frequently over time.

Additionally, the method 700 can include checking the game to determine that the change to the game tests results in failure of the game action patterns of the convergence to pass the game tests ("Game Changed" block 712). That is, the game response to the convergent game action patterns can be configured so that the previously successful game action patterns fail to be useful in overcoming the game tests. The process of checking to determine whether the game has actually changed can be performed before the change to the game goes live and pushed out to the computing devices 116. For example, a previous keystroke combination with co-occurrent game actions that inflicted a significant reduction in an opponent's heath or viability may become ineffective or useless by either the effectiveness being reduced or the resistance to the co-occurrent game actions being increased by the opponent. For example, a certain keystroke combination may cause a reduction of 50 health points to an opponent, and the game can be changed so that this certain keystroke combination may have reduced effectiveness so that the key stroke combination does not result in any lost health points or only a small number of health points, such as 5 health points, to the opponent or to all opponents. The reduction in effectiveness of co-occurrent game actions can disincentivize players 118 from performing the certain keystroke combination of the convergent game action patterns.

If the check of the game change indicates that the game has changed sufficiently in response to the co-occurrent game actions of the game action patterns to counteract convergence, the change to the game can be implemented in the actual game and pushed out to the computing devices 116 ("Change Game" block 714). That is, if a check of the game change indicates inhibition of the convergent game play, the game change can be actually implemented and applied to the game run on the number of computing devices 116.

On the other hand, if the check of the game change shows that the game is not sufficiently changed to overcome or inhibit the convergent game play, an iterative process can be performed with incremental changes to the game until a change is found that changes the game to overcome or inhibit the convergent game play.

At some point, the game may be changed in a manner sufficient to overcome convergence, but the manner in which the game is changed can be varied. After the game change is created it can be immediately implemented; however, the implementation of the game change can result in the game being down or being upgraded and unplayable for too long or during a period having typically high numbers of players 118. As such, the method 700 can include scheduling an update to the game to implement the game change to the game tests of the game scenario type ("Schedule Implementation Of Game Change" block 716). The scheduling can take various game parameters into consideration to optimize the timing to minimize adverse consequences of the implementation of the game change. Thus, scheduling can maintain QoE. Some examples of game parameters that may be considered may include peak usage times and periods, low usage times and periods, demographic usage profiles, data transceived, or the like or any combination thereof. These parameters can be used so that the selection of a time and duration of game change implementation can have minimal negative consequences with respect to the gaming system 110 and/or players 118.

In some embodiments, the game facilitated by the gaming system 110 can be a MMORPG played on a number of computing devices 116 and hosted by the gaming system 110 over the gaming network 112. The game scenario can be a battle environment that the players 118 interact with alone or with other players 118, where the game scenario can be generated and controlled with the game scenario module 122. The game tests can be opponents in a battle, which are usually game-created opponents that can be generated and controlled with the game test module 124. The game actions can be battle game actions that include game actions typically found in a battle game.

In example embodiments, the game can include a MMORPG played on a large number (e.g., thousands, tens of thousands, hundreds of thousands to millions) of computing devices 116 and hosted by the gaming network 112 operably coupled to the gaming server 126. The game scenarios can include a battle, and the game tests can include opponents in the battle. The game actions can include battle actions in response to the opponent tests and battle scenarios. The convergence of game play can be determined by the extracted, selected or otherwise identified game action patterns that have been used by a number of players 118 to defeat the opponents in the battles.

In some embodiments, the game can include a battle game. As such, the first log database 132 can have the first log data (e.g., Log 1) of battle actions of the battles in the game for the number of computing devices 116. In the first log database 132, the battle actions (e.g., game actions) may be arranged with respect to the individual battles, and thereby may be arranged on the basis of individual scenarios or individual tests. The second log database 134 can have the second log data (e.g., Log 2) of battle actions for individual computing devices 116. In the second log database 134, the battle actions (e.g., game actions) may be arranged with respect to the individual computing devices 116.

Figure 8:
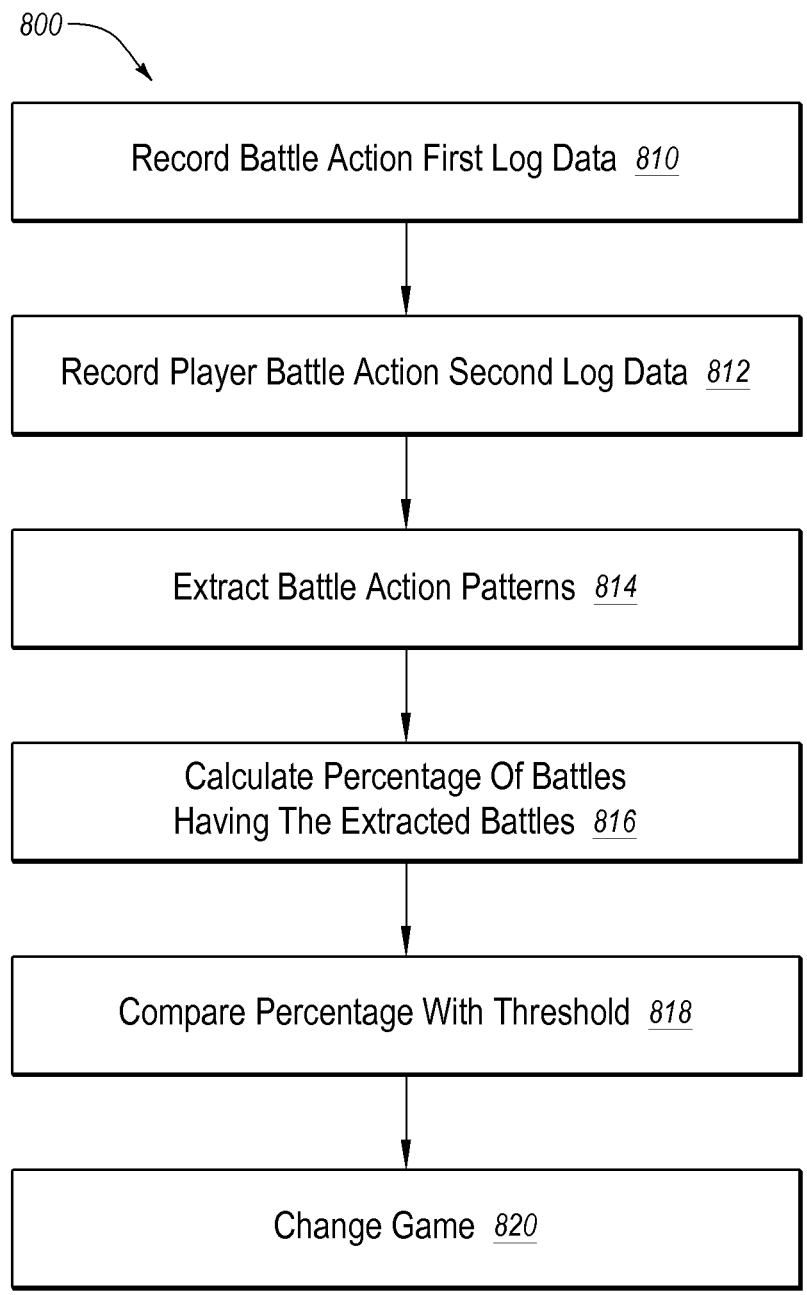
FIG. 8 includes a flow diagram that describes a method for changing a game in response to convergent game play.

FIG. 8 includes a flow diagram that describes a method 800 for changing a game in response to convergent game play, arranged in accordance with at least some embodiments described herein. The method 800 can include the following: "Record Battle Action First Log Data" (block 810); "Record Player Battle Action Second Log Data" (block 812); "Extract Battle Action Patterns" (block 814); "Calculate Percentage Of Player Battles Having The Extracted Battles" (block 816); "Compare Percentage With Threshold" (block 818); and "Change Game" (block 820). The method 800 can be performed alone or in combination with any of the other methods. Here, the game can include a battle game scenario.

With combined reference to FIGS. 1 and 8, the method 800 can include recording first log data in the first log database 132, the first log data representing battle actions of the battles in the game for the players 118 ("Record Battle Action First Log Data" block 810). The battle actions can include combinations of keystrokes that are implemented by the players 118 when battling general opponents or a selected type of opponent, such as a level boss or special monster. While it can be useful to record the battle actions for a portion or all battles in the game, a representative portion of battles can be sufficient.

The method 800 can also include recording second log data in the second log database 134, the second log data representing battle actions of battles in the game for the individual players ("Record Player Battle Action Second Log Data" block 812). The second log database 134 can include data arranged on a per player 118 basis. Here, the second log database 134 can include the battle actions for the players 118 or for each player 118 which may or may not be linked to the battle or opponent for which the battle actions are implemented.

The gaming method 800 can include extracting battle action patterns with game actions having co-occurrence probabilities over a co-occurrence probability threshold from the first log database 132 ("Extract Battle Action Patterns" block 814). The co-occurrence probabilities can be based on the co-occurrence of game actions in the battle action patterns in the first log database 132.

The method 800 can include calculating a percentage of the battles in the second log database 134 having the extracted battles from the first log database 132 ("Calculate Percentage Of Battles Having The Extracted Battles" block 816). The calculated percentage of battles having the extracted battle action patterns can provide an indication of convergent game action patterns when the percentage is at a high level or if the percentage increases over time.

The percentage can be compared against a percentage threshold ("Compare Percentage With Threshold" block 818). The threshold can be arbitrary or set as desired as described above.

The gaming method 800 can include changing the game by changing the battles (e.g., game scenarios) or the opponents (e.g., game tests) when the percentage is above the percentage threshold ("Change Game" block 820). However, in some embodiments, the game may not be changed when the percentage is below the threshold.

The protocol for changing a game to overcome or inhibit convergent game play can be applied to any MMORPG or other online game. The game can have game scenarios and game tests that can be found in any MMORPG, ranging from any challenge, quest, task, puzzle, battle, opponent, level boss, monster, or the like. For example, the game scenarios and game tests can be similar to those found in MMORPGs or other online games, such as in the World of Warcraft games, Final Fantasy games, Second Life games, or others.

One example of a reason that MMORPGs are popular and successful is the gratification that can be obtained by winning battles with monsters of the game. As such, the gratification can be obtained by overcoming or passing a game test in the form of a monster or passing a game scenario by winning a battle or overcoming a battle stage. In the battles with the monsters, players can enter keystrokes or commands that are implemented in the game as a game action, such as "attack" or "magic", where the game actions can be in real time or on each turn or at regular intervals to conquer the monsters. The game action patterns that are successful can be duplicated and passed between players 118.

In some embodiments, a player 118 may use a computing device 116 with a keyboard and a mouse to implement game actions or other game operations in MMORPGs such that the physical input may include a simple command selecting an operation that does not require complex, quick input (e.g., complex quick inputs are often required in action games). The simple game action implementation can provide a genre of games that are popular among a wide variety of players, from both young and elderly and males and females. However, the features of detecting game play convergence and changing a game can be applied to action games that have complex and timed inputs, such as any of the first-person battle games.

One obstacle in long-term operation of an MMORPG may include players 118 getting tired of the game due to a convergent game play by a number of the players implementing game actions that are repeated and frequently have specific game action patterns that are successful. For example, if a player 118 finds a combination of magic tricks or other game actions that is extremely effective as an attack against an opponent, the player 118 may play the game by using that combination of game actions often and repeatedly so that the same pattern of game actions is implemented frequently with high co-occurrence as to certain game actions. The repetition of co-occurrent game actions can result in the player 118 eventually becoming tired of the game due to the repetitive nature of the game play caused by convergent game play. The game action patterns become convergent when a number of players 118 implement the same game action patterns.

Additionally, one obstacle in long-term operation of MMORPGs may include the exchange of information of successful game action patterns. In part, information exchange is facilitated by the players 118 already being connected online, which allows the players 118 to exchange information with each other. As such, convenient "winning patterns" of game actions can spread rapidly through the players 118 or through a subpopulation of the players 118.

In some embodiments, the game can be configured to change so that "winning patterns" of game actions continue to change to allow players 118 to adapt and learn or develop new "winning patterns" of game actions. The "winning patterns" can change so that when game action patterns become convergent, the game action patterns become ineffective. New "winning patterns" of game actions can then be created by the players 118. New "winning patterns" of game actions can provide pleasure to players of MMORPGs as the player 118 can then tell it to other players 118. Accordingly, changing the game can provide the benefit of periodically providing pleasure to the players 118 by the player 118 being able to periodically create a new "winning pattern" of game actions after a previous "winning pattern" no longer works after a game is changed. Thus, it can be beneficial to perform game play adjustment operations (e.g., gaming system and game updates) to appropriately adjust the emergence of new game tests (e.g., monsters) in response to game actions to overcome or inhibit excessive "winning patterns" of game actions. The game play adjustment operations can therefore change the game.

Figure 9:
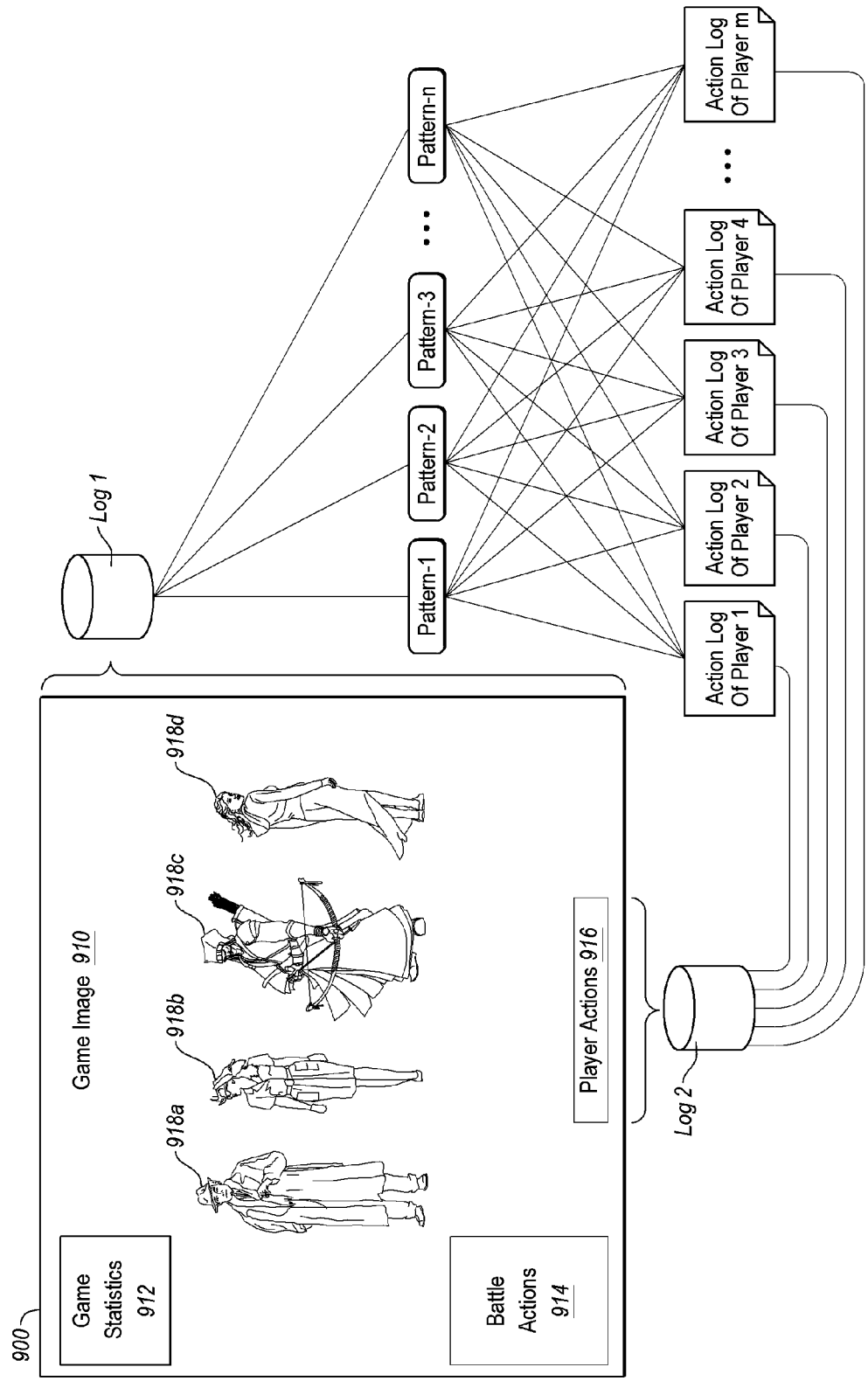
FIG. 9 includes a schematic representation of a graphical user interface of a game and a data analysis protocol for detecting convergent game play.

FIG. 9 includes a schematic representation of a graphical user interface of a game and a data analysis protocol for detecting convergent game play, arranged in accordance with at least some embodiments described herein. FIG. 9 includes: a graphical user interface 900; a game image 910; game statistics 912; battle actions 914; player actions 916; player avatars 918a, 918b, 918c, 918d; Log 1; Log 2; "Pattern-1" to "Pattern-n"; and "Action Log Of Player 1" to "Action Log Of Player m." With combined reference to FIGS. 1 and 9, the schematic representation includes the GUI 900 showing the game image 910 of game play, which may be configured generally or specifically for a particular one of the players 118, for example. The GUI 900 can include various types of information about the game, game scenario, game tests, friendly game players, and enemy game players, or other aspects of the game. The GUI 900 can include the game statistics 912, the battle actions 914 of opponents, player actions 916 of current players 118, and may show the player avatars 918a, 918b, 918c, 918d as virtual characters. The game tests can be shown as monsters that battle the player avatars 918a, 918b, 918c, 918d in the battle game scenarios. The game statistics 912, battle actions 914 and player actions 916 are examples of game data. The game data shown on the GUI 900 or other game data can be processed to determine convergent game play.

The game data can be recorded for some, a portion, or all battles in a game and may be stored in, e.g., two types of logs:

Log 1 (e.g., first log database 132) that includes game action logs of some, a portion, or all battles in the game; and Log 2 (e.g., second log database 134) that includes game action logs in response to the battles for some, a portion or all of the individual players 118. Log 1 may include the game action log for battles (e.g., see Table 1), where the game action logs of the battles in the game can be analyzed. The analysis of Log 1 can include extraction of game action patterns with high game action co-occurrence probabilities. For example: "Pattern 1" can include the following game action pattern: (Auxiliary magic for enhancing the power of magic attack)+(Fire-based whole attack magic); "Pattern 2" can include the following game action pattern: (Direct attack at the compromise of agility)+(Auxiliary magic for enhancing agility)+(Auxiliary magic for reducing opponent's avoidance ability); . . . through to "Pattern n," which can include the following game action pattern: (Action 1)+(Action 2)+ . . . (Action x). The game action patterns "Pattern 1" through "Pattern n" can be stored and processed for convergent game play analysis. The gaming system 110 can record game action logs of players: 1, 2, 3, . . . m, and compare the game actions logs with the patterns of "Pattern 1" through "Pattern n." The comparison can be performed to cross-correlate each of the battle action patterns with the action logs of the individual players 118 as shown.

For Log 2, the game action logs of the battles of individual players 118 can be analyzed. Log 2 may include the action log of the players 118 (e.g., action logs of player 1 through player m) arranged to show the game actions in response to battles on a per player 118 basis (e.g., see Table 2). The analysis of Log 2 can include calculating the percentage of the battles including the extracted game action patterns. When the percentage of battles including the co-occurrent game actions in repeated game action patterns exceeds a threshold (e.g., 60%), it may be determined that game play convergence has occurred, and the process for game change can be performed. Thus, each of the game play patterns identified to be used frequently or repeatedly can be compared to some, a portion, or all of the game actions of the players 118 to see if the game action pattern is used across a number or defined subpopulation of players 118. When the game action patterns are used across a subpopulation of players 118, there may be convergent game play having the same game action patterns being repeated.

In some embodiments, the gaming system 110 can extract game action patterns with high co-occurrence probabilities from the first log database 132. The game system 110 can process the extracted game action patterns by assuming that there are "n" types of game actions in the game system, and assuming that the average number of game actions during a game scenario or game test is "r." The number of possible co-occurrent patterns of battle action can be expressed as "nHr," which denotes the repeated combination of "r" actions from "n" types of action, allowing repetition. The "nHr" can be calculated according to the following Equation 1:

$$_nH_r = {}_{n+r-1}C_r = \binom{n+r-1}{r} = \frac{(n+r-1)!}{r!(n-1)!} \quad \text{Equation 1}$$

The gaming system 110 can calculate the frequencies of occurrence of a portion or all combinations of co-occurrent game actions or game action patterns from the first log database 132, and select certain co-occurrent game actions or game action patterns with frequencies of occurrence exceeding a predetermined threshold (e.g., 20%) as game action patterns with high game action co-occurrence probabilities.

In one embodiment, a method for determining convergence in game play actions of a game can include: providing a game simultaneously to a number of computing devices; identifying a game scenario type of the game that includes one or more game tests provided to the computing devices; obtaining one or more game actions from the computing devices in response to one or more game tests of the game scenario type; and determining a convergence of the one or more game actions across the computing devices that pass the one or more game tests. The determination of convergence in game play actions can trigger the game to be scheduled for a game change.

A method for detecting convergence in game play actions can also include: recording first log data of the one or more game actions for the one or more game tests received from the computing devices, where the first log data is independent of a specific computing device of the computing devices; recording second log data of the one or more game actions for the one or more game tests from the computing devices, where the second log data can be dependent on a specific computing device; extracting one or more game actions with high co-occurrence from the first log data; calculating frequency of occurrence of the extracted one or more co-occurrent game actions in the second log data; and comparing the calculated frequency of occurrence with a frequency of occurrence threshold, when the calculated frequency of occurrence is less than or equal to the frequency of occurrence threshold, then there may be convergence of the extracted one or more game actions.

In one embodiment, a method for detecting convergence in game play actions can include: recording first log to include game actions for one or more specific game tests from the multiple number of computing devices; recording the second log to include game actions for game tests from specific computing devices in response to the one or more specific game tests; calculating the frequency of occurrence of the combinations of co-occurrent game actions from the first log; selecting one or more game actions with co-occurrent game actions in repeated game action patterns that exceed the frequency of occurrence threshold, these selected one or more game actions being the extracted one or more game actions from the first log; and calculating frequency of occurrence in the second log of the extracted one or more game actions from the first log.

In one embodiment, the method for detecting convergence in game play can include calculating a percentage of the one or more game tests in the second log that includes the extracted one or more game actions from the first log with the one or more game tests of each computing system of the second log. When the percentage is above a predetermined percentage threshold, the convergence is determined. On the other hand, when the percentage is below the predetermined threshold, convergence is not detected.

After convergence of game actions is detected, a gaming system can implement a protocol for changing the game, such as providing a game update, so that the convergence can be overcome or inhibited. That is, the game can be changed in such a manner that the convergent game actions become less useful or useless in the game. Accordingly, the game actions involved in the convergence can become less desirable to use, and thereby the same game actions may not be used.

In one embodiment, changing a game can include creating a game change or game update that can be implemented in the gaming system or game. The convergent game action patterns can be modified by the computing system or game so that they have less effect or no effect. On the other hand, certain game scenarios or game tests can be modified by the gaming system or game so that the convergent game actions are no longer effective against the certain game scenarios or game tests.

In one embodiment, changing a game can include obtaining a game change and then testing it in the gaming system for the game to see if it changes the game in a manner to overcome or inhibit the convergence. That is, the game change can be processed through a simulation or test population of players to ensure that the convergence is overcome or inhibited before the game change is pushed out to the general population of players. As such, the protocol for changing a game can include checking that the change to the one or more game scenarios or game tests results in failure of the one or more game actions of the convergence to pass the one or more game scenarios or game tests.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or computing systems, which can, of course, vary. It is also to be understood that the terminology used herein is for the purpose of describing particular embodiments only, and is not intended to be limiting.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems as well as network elements, and/or any other computing device.

There is little distinction left between hardware and software implementations of systems; the use of hardware or software is generally (but not always) a design choice representing cost vs. efficiency tradeoffs (in certain contexts the choice between hardware and software can become significant). There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again, alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

Figure 10:
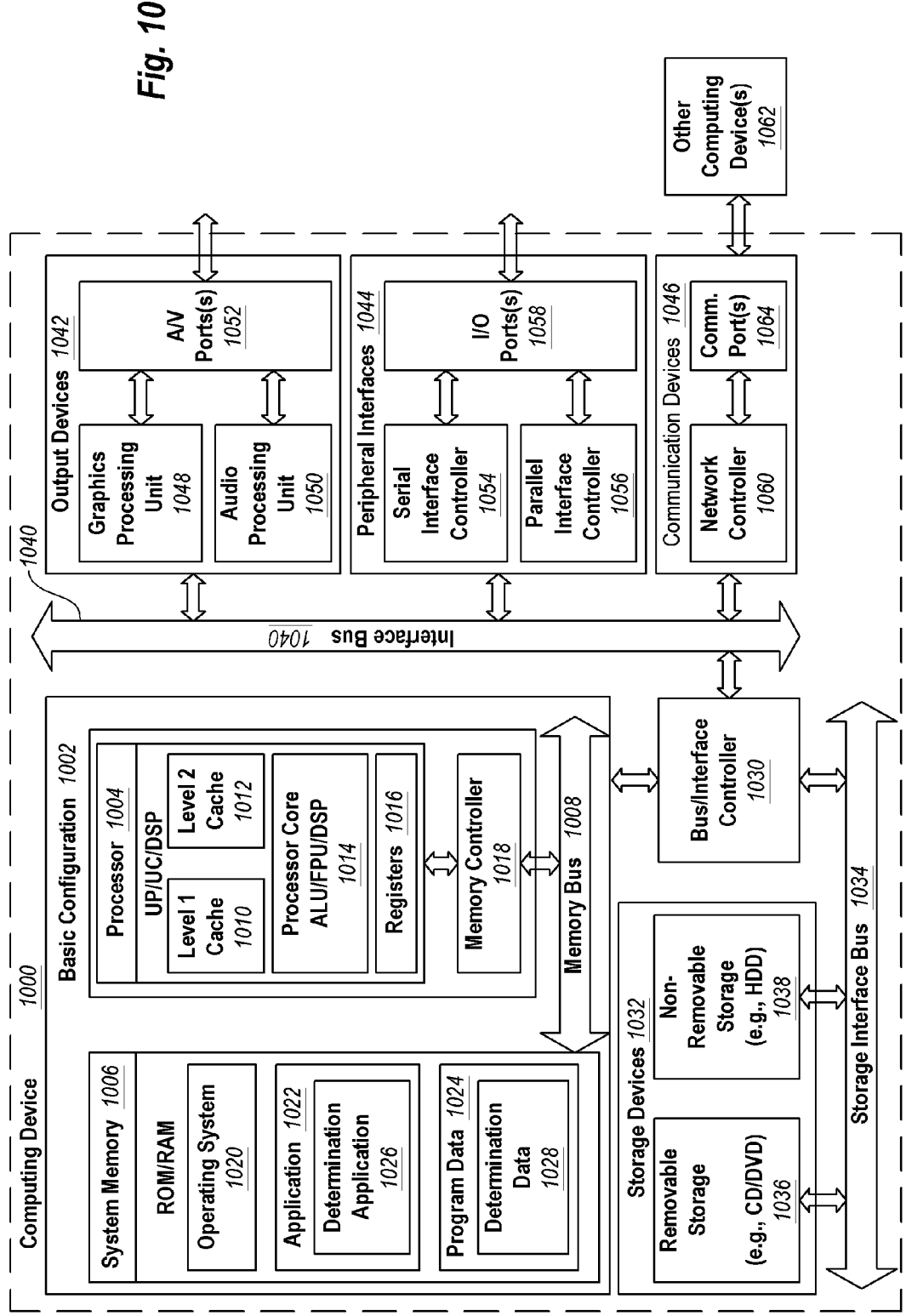
FIG. 10 includes a schematic representation of an example computing device that may be used to implement convergent game play detection and game changing.

FIG. 10 includes a schematic representation of an example computing device 1000 that may be used to implement convergent game play detection and game changing, arranged in accordance with at least some embodiments described herein. The computing device can be implemented as a computing device, computing system, gaming system, gaming system module, gaming device, gaming server, logging module, log database, pattern detection module, convergence analyzing module, game change module, scheduler module, game change schedule module, and which can be operated with a gaming network to facilitate game play. The computing device 1000 can be arranged to perform any of the computing methods described herein. In a very basic configuration 1002, computing device 1000 generally includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include a determination application 1026 that is arranged to perform the functions as described herein including those described with respect to methods described herein. Program Data 1024 may include game data 1028 that may be useful for performing the methods and functions described herein. In some embodiments, application 1022 may be arranged to operate with program data 1024 on operating system 1020 to perform the methods and operations described herein.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations. The computing device 1000 can also be any type of network computing device. The computing device 1000 can also be an automated system as described herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A method to change a game, the method comprising:
   providing, by a processor, a game simultaneously to a plurality of computing devices;
   identifying, by the processor, a game scenario type of the game that includes one or more game tests provided to the plurality of computing devices;
   obtaining, by the processor, one or more game actions from the plurality of computing devices in response to the one or more game tests of the game scenario type;
   determining, by the processor, a convergence of the one or more game actions across the plurality of computing devices that pass the one or more game tests, wherein determining the convergence with respect to the one or more game tests across the plurality of computing devices that pass the one or more game tests includes analyzing the one or more game actions to identify co-occurrent game actions from each of two or more of the plurality of computing devices in response to a common one of the one or more game tests, and wherein the co-occurrent game actions are co-occurrent at each of the two or more of the plurality of computing devices individually;
   changing, by the processor, the common one of the one or more game tests of the game scenario type such that the one or more game actions of the convergence fail the changed common one of the one or more game tests;
   recording a first log of the one or more game actions, wherein first log data of the first log is independent of any specific computing device of the plurality of computing devices;
   recording a second log of the one or more game actions, wherein second log data of the second log is dependent on a specific computing device of the plurality of computing devices;
   extracting one or more game actions with at least a preselected co-occurrence from the one or more game actions of the first log;
   calculating a frequency of occurrence of the extracted one or more game actions in the second log; and comparing the calculated frequency of occurrence with a frequency of occurrence threshold, wherein, the extracted one or more game actions are determined to converge in response to the calculated frequency of occurrence being greater than or equal to the frequency of occurrence threshold.

2. The method of claim 1, further comprising:
calculating a percentage of the one or more game tests of the second log that include the extracted one or more game actions of the first log, wherein:
in response to the percentage being above a particular percentage threshold, the convergence is determined; and
in response to the convergence being determined, at least one of the one or more game tests of the game scenario type are changed.

3. The method of claim 1, further comprising:
determining that there are "n" types of game actions from among the one or more game actions provided in response to the one or more game tests;
determining an average number of game actions from among the one or more game actions provided in response to the one or more game tests to be "r";
calculating a number of possible game action patterns with co-occurrence to be nHr according to an equation:

$$nHr = \frac{(n+r-1)!}{r!(n-1)!}; \text{ and}$$

calculating a frequency of occurrence of all combinations of game actions from among the one or more game actions provided in response to the one or more game tests from nHr.

4. The method of claim 1, further comprising:
prior to changing the common one of the one or more game tests, creating a change to the common one of the one or more game tests; and
checking that the change to the common one of the one or more game tests results in failure of the one or more game actions of the convergence to pass the common one of the one or more game tests.

5. The method of claim 1, further comprising scheduling an update to the game to implement the change to the common one of the one or more game tests of the game scenario type.

6. The method of claim 1, wherein:
the game comprises a massive multiplayer online role playing game (MMORPG) played on the plurality of computing devices and hosted by a computing network;
the game scenario comprises a battle;
the one or more game tests comprise opponents in the battle;
the one or more game actions comprise battle actions;
the battle actions comprise actions from the plurality of computing devices in response to the opponents in the battle; and
the convergence is determined by identification of game action patterns that defeat one or more of the opponents in the battle.

7. The method of claim 6, further comprising:
recording a first log of battle actions of a plurality of battles that include the battle in the MMORPG for the plurality of computing devices;
recording a second log of battle actions of the plurality of battles for individual computing devices included in the plurality of computing devices;
extracting battle action patterns with co-occurrence probabilities over a co-occurrence probability threshold from the first log;
calculating a percentage of the plurality of battles of the second log that include the extracted battle action patterns with the co-occurrence probabilities from the first log; and
changing at least one of the one or more tests in response to the percentage being above a percentage threshold.

8. The method of claim 1, wherein changing the common one of the one or more game tests of the game scenario type such that the one or more game actions of the convergence fail the common one of the one or more game tests comprises changing an effectiveness of the one or more game actions of the convergence as a response by the plurality of computing devices to the common one of the one or more game tests.

9. A system to change a game, the system comprising:
a game server that includes a processor and that is configured to be operably coupled to and provide a game simultaneously to a plurality of computing devices, the game server including a game scenario type of the game, the game scenario type including one or more game tests;
a game action log module operably coupled to the game server;
a memory configured to store:
a first log database operably coupled to the game action log module and including one or more game actions for the one or more game tests, wherein the one or more game actions for the one or more game tests comprise one or more game actions received by the game action log module from the plurality of computing devices in response to the one or more game tests; and
a second log database operably coupled to the game action log module and including the one or more game actions for the one or more game tests, wherein the one or more game actions for the one or more game tests are associated in the second log database with computing devices of the plurality of computing devices;
a game action pattern detection module operably coupled to the first log database;
a game action convergence analysis module operably coupled to the second log database and to the game action pattern detection module, and configured to determine a convergence of the one or more game actions across the plurality of computing devices that pass one or more game tests of the game, wherein the game action convergence analysis module is configured to determine the convergence by analysis of the one or more game actions to identify co-occurrent game actions from each of two or more of the plurality of computing devices in response to a common one of the one or game more tests, and wherein the co-occurrent game actions are co-occurrent at each of the two or more of the plurality of computing devices individually; and
a game change module operably coupled to the game action convergence analysis module and to the game server, the game change module configured to change the common one of the one or more game tests of the game scenario type such that the one or more game actions of the convergence fail the changed common one of the one or more game tests,
wherein:
the game action pattern detection module is configured to calculate a frequency of occurrence of game action patterns from the first log database and is configured to select co-occurrent game actions of the game action patterns that include frequencies of occurrence that exceed a frequency of occurrence threshold; and the game action convergence analysis module is configured to calculate a frequency of occurrence of the one or more game actions of the second log database for each of the selected co-occurrent game actions from the game action pattern detection module to determine the convergence.

10. The system of claim 9, wherein the game change module is configured to change the common one of the one or more game tests of the game scenario type in response to the convergence being determined.

11. The system of claim 9, wherein:
the first log database includes a first log of the one or more game actions for the one or more game tests of the plurality of computing devices, wherein first log data of the first log is independent of any specific computing device of the plurality of computing devices;
the second log database includes a second log of the one or more game actions for the one or more game tests of the plurality of computing devices, wherein second log data of the second log is dependent on a specific computing device of the plurality of computing devices;
the game action pattern detection module includes one or more game actions with at least a preselected co-occurrence extracted from the one or more game actions of the first log; and
the game action convergence analysis module includes frequency of occurrence values of the extracted one or more game actions in the second log, the frequency of occurrence values being calculated in relation to a frequency of occurrence threshold.

12. The system of claim 11, wherein:
the game action convergence analysis module includes a calculated percentage of the one or more game tests in the second log that result in the extracted one or more game actions from the first log;
in response to the percentage being above a particular percentage threshold, the convergence is determined; and
in response to the convergence being determined, the game change module includes one or more changed game tests for the game scenario type, the one or more changed game tests including the changed common one of the one or more game tests.

13. The system of claim 12, wherein the game change module includes instructions to schedule an update to the game to implement the changed common one of the one or more game tests of the game scenario type.

14. The system of claim 9, wherein:
the game comprises a massive multiplayer online role playing game (MMORPG) played on the plurality of computing devices and hosted by a computing network that includes the game server;
the game scenario comprises a battle;
the one or more game tests comprise opponents in the battle;
the one or more game actions comprise battle actions;
the battle actions comprise actions from the plurality of computing devices in response to the opponents in the battle; and
the convergence is determined by identification of game action patterns that defeat one or more of the opponents in the battle.

15. The system of claim 14, wherein:
the first log database includes a first log of battle actions of a plurality of battles that include the battle in the MMORPG for the plurality of computing devices;
the second log database includes a second log of battle actions of the plurality of battles for individual computing devices of the plurality of computing devices;
the game action pattern detection module includes extracted battle action patterns with co-occurrence probabilities over a co-occurrence probability threshold from the first log database;
the game action convergence analysis module includes a calculated percentage of the plurality of battles in the second log database that include the extracted battle action patterns with the co-occurrence probabilities from the first log database; and
the game change module includes instructions to change at least one of the one or more game tests in response to the percentage being above a percentage threshold.

16. The system of claim 9, wherein to change the common one of the one or more game tests of the game scenario type such that the one or more game actions of the convergence fail the common one of the one or more game tests, the game change module is configured to change an effectiveness of the one or more game actions of the convergence as a response by the plurality of computing devices to the common one of the one or more game tests.

17. A method to change a game on a game system, the method comprising:
providing, by a processor, a game simultaneously to a plurality of computing devices, the game including a game scenario type and the game scenario type including one or more game tests;
obtaining, by the processor, a plurality of game actions from the plurality of computing devices in response to the one or more game tests of the game scenario type;
recording, by the processor, the plurality of game actions for the one or more game tests into a first log database;
recording, by the processor, the plurality of game actions for the one or more game tests associated with computing devices of the plurality of computing devices into a second log database;
calculating, by the processor, a frequency of occurrence of game action patterns that each include co-occurrent game actions from the first log and selecting co-occurrent game actions of the game action patterns that include frequencies of occurrence that exceed a frequency of occurrence threshold, wherein the selected co-occurrent game actions include at least two of the plurality of game actions that are co-occurrent at each of at least two of the plurality of computing devices individually;
calculating, by the processor, a frequency of occurrence of each of the plurality of game actions of the second log database for each of the selected co-occurrent patterns to determine convergence of one or more game actions included in the plurality of game actions in response to the one or more game tests;
determining, by the processor, that the game is to change the one or more game tests of the game scenario type in response to the convergence of the one or more game actions being determined; and
changing, by the processor, the one or more game tests such that the one or more game actions fail the changed one or more game tests.

18. The method of claim 17, wherein:
the game comprises a massive multiplayer online role playing game (MMORPG) played on the plurality of computing devices and hosted by a computing network;
the game scenario comprises a battle;
the one or more game tests comprise opponents in the battle;
the plurality of game actions comprise battle actions;
the battle actions comprise actions from the plurality of computing devices in response to the opponents in the battle; and
the convergence is determined by identification of game action patterns that defeat one or more of the opponents in the battle.

19. The method of claim 18, further comprising:
recording a first log of battle actions of a plurality of battles that include the battle in the MMORPG for the plurality of computing devices;
recording a second log of battle actions of the plurality of battles for individual computing devices of the plurality of computing devices;
extracting battle action patterns with co-occurrence probabilities over a co-occurrence probability threshold from the first log;
calculating a percentage of the plurality of battles of the second log that include the extracted battle action patterns with the co-occurrence probabilities from the first log; and
changing one or more of the plurality of game tests in response to the percentage being above a percentage threshold.

* * * * *

UNITED STATES PATENT AND TRADEMARK OFFICE
CERTIFICATE OF CORRECTION

PATENT NO.          : 8,905,838 B2
APPLICATION NO.     : 13/533774
DATED               : December 9, 2014
INVENTOR(S)         : Kurabayashi et al.

It is certified that error appears in the above-identified patent and that said Letters Patent is hereby corrected as shown below:

Title Page

Page 2, in Item (56), under "OTHER PUBLICATIONS", in Column 1, Line 1, delete ""Wold" and insert -- "World --, therefor.

In the Drawings

In Fig. 5, Sheet 4 of 9, in Box "510", in Line 2, delete "Co-Occurent" and insert -- Co-Occurrent --, therefor.

In Fig. 6, Sheet 5 of 9, in Box "614", in Line 1, delete "Co-Occurence" and insert -- Co-Occurrence --, therefor.

In Fig. 10, Sheet 9 of 9, delete " 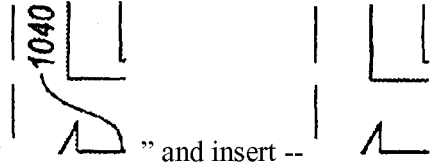 " and insert -- --, therefor.

In Fig. 10, Sheet 9 of 9, delete "UP/UC/DSP" and insert -- µP/µC/DSP --, therefor.

In the Specification

In Column 8, Line 43, delete "database 132" and insert -- database 134 --, therefor.

In Column 8, Line 66, delete "module 130" and insert -- module 136 --, therefor.

In Column 10, Line 57, delete "descried" and insert -- described --, therefor.

Signed and Sealed this
Twenty-eighth Day of July, 2015

Michelle K. Lee
*Director of the United States Patent and Trademark Office*

CERTIFICATE OF CORRECTION (continued)
U.S. Pat. No. 8,905,838 B2

In Column 13, Lines 4-5, delete "gamming" and insert -- gaming --, therefor.

In Column 17, Line 42, delete "Convergence" and insert -- Convergence, --, therefor.

In Column 18, Line 25, delete "CoOccurrence" and insert -- Co-Occurrence --, therefor.

In Column 26, Line 22, delete "and or" and insert -- and/or --, therefor.

In the Claims

In Column 32, Line 54, in Claim 9, delete "game more" and insert -- more game --, therefor.